United States Patent
Ikai et al.

(10) Patent No.: US 11,631,199 B2
(45) Date of Patent: Apr. 18, 2023

(54) IMAGE FILTERING APPARATUS, IMAGE DECODING APPARATUS, AND IMAGE CODING APPARATUS

(71) Applicant: Sharp Kabushiki Kaisha, Osaka (JP)

(72) Inventors: Tomohiro Ikai, Sakai (JP); Tomoyuki Yamamoto, Sakai (JP); Norio Itoh, Sakai (JP); Yasuaki Tokumo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 305 days.

(21) Appl. No.: 16/636,669

(22) PCT Filed: Aug. 3, 2018

(86) PCT No.: PCT/JP2018/029247
§ 371 (c)(1),
(2) Date: Feb. 5, 2020

(87) PCT Pub. No.: WO2019/031410
PCT Pub. Date: Feb. 14, 2019

(65) Prior Publication Data
US 2021/0150767 A1    May 20, 2021

(30) Foreign Application Priority Data

Aug. 10, 2017 (JP) .............................. JP2017-155903
Mar. 20, 2018 (JP) .............................. JP2018-053226

(51) Int. Cl.
*H04N 19/00* (2014.01)
*G06T 9/00* (2006.01)
(Continued)

(52) U.S. Cl.
CPC ............. *G06T 9/002* (2013.01); *G06N 3/045* (2023.01); *G06T 3/4046* (2013.01);
(Continued)

(58) Field of Classification Search
CPC .... G06N 3/0454; G06N 3/0445; G06T 9/002; G06T 3/4046; H04N 19/117;
(Continued)

(56) References Cited

U.S. PATENT DOCUMENTS

2014/0334542 A1* 11/2014 Lee ...................... H04N 19/159
375/240.12
2017/0169567 A1* 6/2017 Chefd'hotel ......... G06N 3/0454
(Continued)

FOREIGN PATENT DOCUMENTS

JP    2017-055434 A    3/2017
WO    2016/199330 A1   12/2016

OTHER PUBLICATIONS

Official Communication issued in International Patent Application No. PCT/JP2018/029247, dated Oct. 2, 2018.
(Continued)

*Primary Examiner* — Zhihan Zhou
(74) *Attorney, Agent, or Firm* — Keating & Bennett, LLP

(57) ABSTRACT

To apply a filter to input image data in accordance with an image characteristic. A CNN filter includes a neural network configured to receive an input of one or multiple first type input image data and one or multiple second type input image data, and output one or multiple first type output image data, the one or multiple first type input image data each having a pixel value of a luminance or chrominance, the one or multiple second type input image data each having a pixel value of a value corresponding to a reference parameter for generating a prediction image and a differential image, the one or multiple first type output image data each having a pixel value of a luminance or chrominance.

12 Claims, 34 Drawing Sheets

(51) Int. Cl.
  *H04N 19/105* (2014.01)
  *H04N 19/117* (2014.01)
  *H04N 19/159* (2014.01)
  *H04N 19/182* (2014.01)
  *H04N 19/186* (2014.01)
  *G06T 3/40* (2006.01)
  *G06N 3/045* (2023.01)
(52) U.S. Cl.
  CPC ......... *H04N 19/105* (2014.11); *H04N 19/117* (2014.11); *H04N 19/159* (2014.11); *H04N 19/182* (2014.11); *H04N 19/186* (2014.11)
(58) Field of Classification Search
  CPC ............... H04N 19/159; H04N 19/176; H04N 19/186; H04N 19/82; H04N 19/119; H04N 19/105; H04N 19/182
  See application file for complete search history.

(56) References Cited

U.S. PATENT DOCUMENTS

| | | | |
|---|---|---|---|
| 2018/0184123 A1* | 6/2018 | Terada | H04N 19/11 |
| 2018/0249158 A1* | 8/2018 | Huang | G06N 3/04 |
| 2020/0120340 A1* | 4/2020 | Park | G06T 9/002 |
| 2021/0125310 A1* | 4/2021 | Pu | G06T 5/002 |

OTHER PUBLICATIONS

Dai et al., "A Convolutional Neural Network Approach for Post-Processing in HEVC Intra Coding", Oct. 29, 2016, 12 pages.
Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, JVET-F1001-v3, Mar. 31-Apr. 7, 2017, 51 pages.

* cited by examiner

IMAGE FILTERING APPARATUS, IMAGE DECODING APPARATUS, AND IMAGE CODING APPARATUS

TECHNICAL FIELD

An aspect of the disclosure relates to an image filtering apparatus, an image decoding apparatus, and an image coding apparatus.

BACKGROUND ART

A video coding apparatus which generates coded data by coding a video, and a video decoding apparatus which generates decoded images by decoding the coded data are used to transmit or record a video efficiently.

Specific examples of a video coding scheme include schemes proposed in H.264/AVC or High-Efficiency Video Coding (HEVC), for example.

In such a video coding scheme, images (pictures) constituting a video are managed by a hierarchical structure including slices obtained by splitting images, Coding Tree Units (CTUs) obtained by splitting slices, units of coding (also referred to as Coding Units (CUs)) obtained by splitting coding tree units, prediction units (PUs) which are blocks obtained by splitting coding units, and transform units (TUs), and are coded/decoded for each CU.

In such a video coding scheme, usually, a prediction image is generated based on local decoded images obtained by coding/decoding input images, and prediction residual (also sometimes referred to as "differential images" or "residual images") obtained by subtracting the prediction images from input images (original image) are coded. Generation methods of prediction images include an inter-picture prediction (an inter prediction) and an intra-picture prediction (intra prediction).

An example of a technique of recent video coding and decoding is described in NPL 1.

An example of a technique using a neural network called Variable-filter-size Residue-learning CNN (VRCNN) is described in NPL 2.

CITATION LIST

Non Patent Literature

NPL: "Algorithm Description of Joint Exploration Test Model 6", JVET-F1001, Joint Video Exploration Team (JVET) of ITU-T SG 16 WP 3 and ISO/IEC JTC 1/SC 29/WG 11, 31 Mar.-7 Apr. 2017

NPL 2: "A Convolutional Neural Network Approach for Post-Processing in HEVC Intra Coding"

SUMMARY

Technical Problem

However, the filter technology using the neural network described above only switches wholly the network in accordance with quantization parameters, and there has been a problem in that a network size increases in a case that a filter is applied in accordance with characteristics of the input image data. There has been a problem in that a filter suitable for coding for each region cannot be applied.

The disclosure has been made in view of the problems described above, and an object of the disclosure is to achieve application of a filter to the input image data in accordance with the image characteristics while suppressing the network size compared to a known configuration.

Solution to Problem

To solve the above-described problem, an image filtering apparatus according to the disclosure includes a neural network configured to receive an input of one or multiple first type input image data and one or multiple second type input image data, and output one or multiple first type output image data, the one or multiple first type input image data each having a pixel value of a luminance or chrominance, the one or multiple second type input image data each having a pixel value of a value corresponding to a reference parameter for generating a prediction image or a differential image, the one or multiple first type output image data each having a pixel value of a luminance or chrominance.

To solve the above-described problem, an image filtering apparatus according to the disclosure includes multiple dedicated neural networks; and a common neural network, wherein each of the multiple dedicated neural networks selectively acts on input image data input to the image filtering apparatus depending on a value of a filter parameter in the input image data, and the common neural network commonly acts on output image data output from each of the multiple dedicated neural networks, regardless of the value of the filter parameter.

To solve the above-described problem, an image filtering apparatus according to the disclosure includes multiple dedicated neural networks; and a common neural network, wherein the common neural network acts on input image data input to the image filtering apparatus, and each of the multiple dedicated neural networks selectively acts on output image data output from the common neural network depending on a value of a filter parameter in the input image data.

Advantageous Effects of Invention

A filter can be applied to the input image data in accordance with the image characteristics compared to a known configuration.

DESCRIPTION OF EMBODIMENTS

First Embodiment

Hereinafter, embodiments of the disclosure are described with reference to the drawings.

Figure 33:
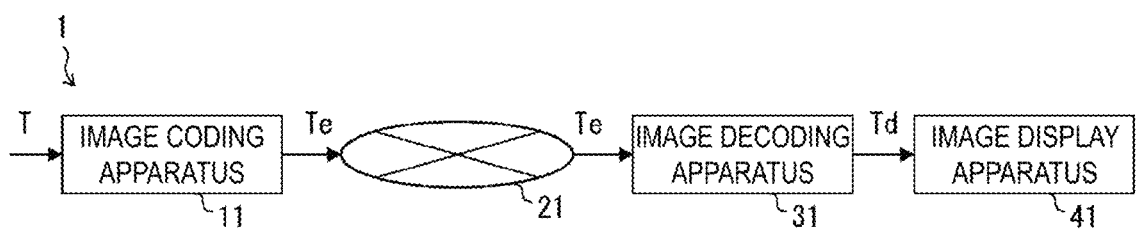
FIG. 33 is a schematic diagram illustrating a configuration of an image transmission system according to the present embodiment.

FIG. 33 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image coding apparatus 11, a network 21, an image decoding apparatus 31, and an image display apparatus 41.

An image T indicating an image of a single layer or multiple layers is input to the image coding apparatus 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. Even in a case of not performing a prediction, in a case of (simulcast), coded data can be compiled.

The network 21 transmits a coding stream Te generated by the image coding apparatus 11 to the image decoding apparatus 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding apparatus 31 decodes each of the coding streams Te transmitted by the network 21, and generates one or multiple decoded images Td.

The image display apparatus 41 displays all or part of one or multiple decoded images Td generated by the image decoding apparatus 31. For example, the image display apparatus 41 includes a display device such as a liquid crystal display and an organic Electro-luminescence (EL) display. In spatial scalable coding and SNR scalable coding, in a case that the image decoding apparatus 31 and the image display apparatus 41 have high processing capability, an enhancement layer image having high image quality is displayed, and in a case of having lower processing capability, a base layer image which does not require as high processing capability and display capability as an enhancement layer is displayed.

Operator

Operators used herein will be described below.

An operator ">>" is a right bit shift operator, "<<" is a left bit shift operator, "&" is a bitwise AND operator, "|" is a bitwise OR operator, and "|=" is an OR assignment operator).

An operator "x?y:z" is a ternary operator representing that y is obtained in case that x is true (that is, other than "0") or z is obtained in a case that x is false (that is, "0").

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

Structure of Coding Stream Te

Prior to the detailed description of the image coding apparatus 11 and the image decoding apparatus 31 according to the present embodiment, the data structure of the coding stream Te generated by the image coding apparatus 11 and decoded by the image decoding apparatus 31 will be described.

Figure 1:
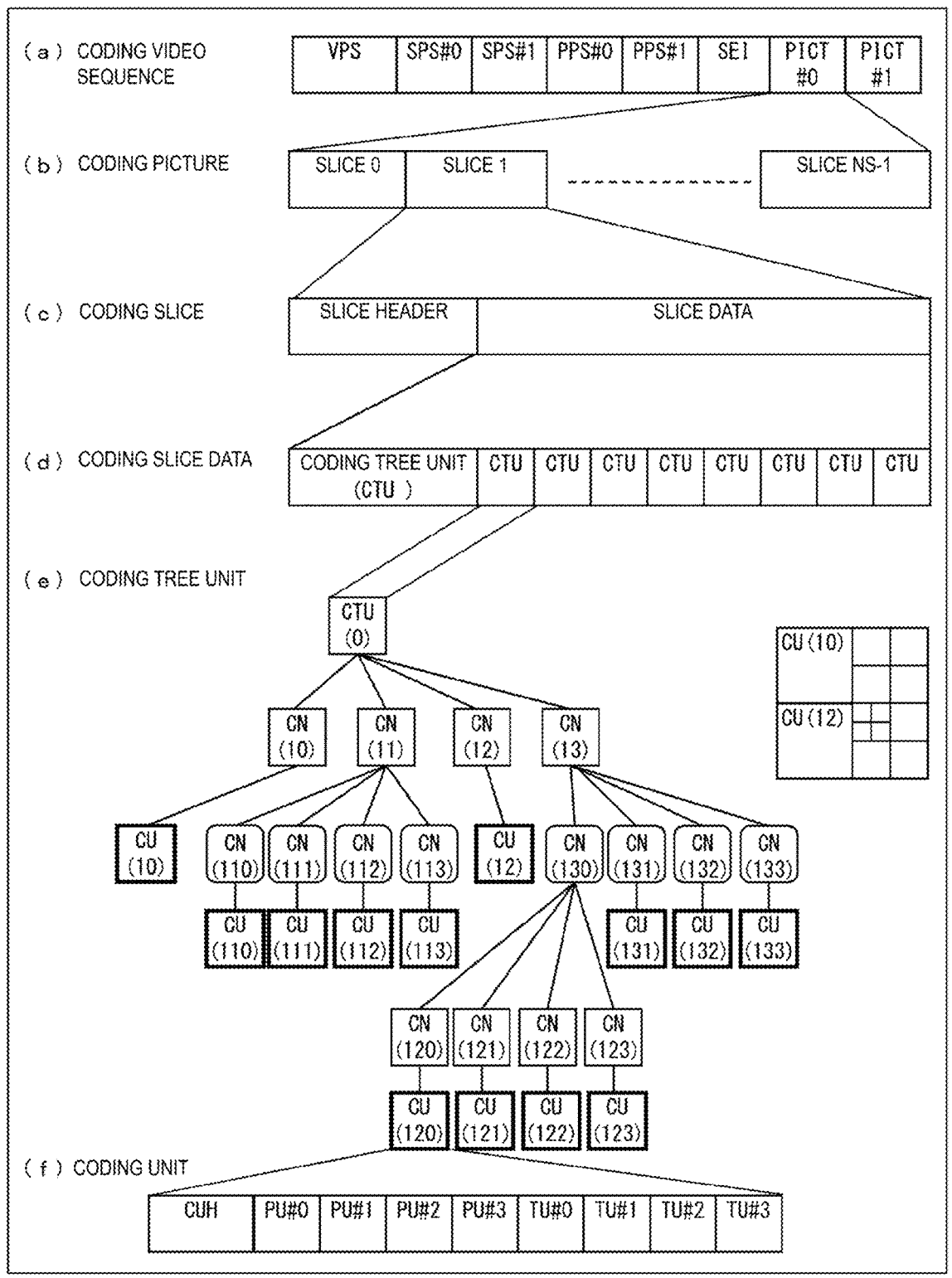
FIG. 1 is a diagram illustrating a hierarchical structure of data of a coding stream according to the present embodiment.

FIG. 1 is a diagram illustrating a hierarchical structure of data in the coding stream Te. The coding stream Te includes a sequence and multiple pictures constituting a sequence illustratively. (a) to (f) of FIG. 1 are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the image decoding apparatus 31 to decode the sequence SEQ of a processing target is prescribed. As illustrated in (a) of FIG. 1, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. In FIG. 1, although an example is illustrated where coded data of #0 and #1, in other words, layer 0 and layer 1 exist, types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the image decoding apparatus 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the image decoding apparatus 31 to decode the picture PICT of a processing target is prescribed. As illustrated in (b) of FIG. 1, the picture PICT includes slices S0 to $S_{NS\_1}$ (NS is the total number of slices included in the picture PICT).

Note that in a case not necessary to distinguish the slices S0 to $S_{NS-1}$ below, subscripts of reference signs may be omitted and described. The same applies to other data included in the coding stream Te described below and described with an added subscript.

Coding Slice

In the coding slice, a set of data referred to by the image decoding apparatus 31 to decode the slice S of a processing target is prescribed. As illustrated in (c) of FIG. 1, the slice S includes a slice header SH and a slice data SDATA.

The slice header SH includes a coding parameter group referred to by the image decoding apparatus 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referred to by the image decoding apparatus 31 to decode the slice data SDATA of a processing target is prescribed. As illustrated in (d) of FIG. 1, the slice data SDATA includes Coding Tree Units (CTUs). The CTU is a block of a fixed size (for example, 64×64) constituting a slice, and may be referred to as a Largest Coding Unit (LCU).

Coding Tree Unit

As illustrated in (e) of FIG. 1, a set of data referred to by the image decoding apparatus 31 to decode a coding tree unit of a processing target is prescribed. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also prescribed as the highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes, and is not split anymore. The coding unit CU is a basic unit of coding processing.

In a case that the size of the coding tree unit CTU is 64×64 pixels, the size of the coding unit may be any of 64×64 pixels, 32×32 pixels, 16×16 pixels, and 8×8 pixels.

Coding Unit

As illustrated in (f) of FIG. 1, a set of data referred to by the image decoding apparatus 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "sub-block". The sub-block includes multiple pixels. In a case that the sizes of the prediction unit and the sub-block are the same, there is one sub-block in the prediction unit. In a case that the prediction unit is larger than the size of the sub-block, the prediction unit is split into sub-blocks. For example, in a case that the prediction unit is 8×8, and the sub-block is 4×4, the prediction unit is split into four sub-blocks formed by horizontal split into two and vertical split into two.

The prediction processing may be performed for each of these prediction units (sub-blocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that expressions of 2N×N and N×2N represent a 1:1 symmetric partition, and expressions of 2N×nU and 2N×nD, and nL×2N and nR×2N represent a 1:3 asymmetric partition and a 3:1 asymmetric partition, respectively. The PUs included in the CU are expressed as PU0, PU1, PU2, and PU3 sequentially.

Figure 2:
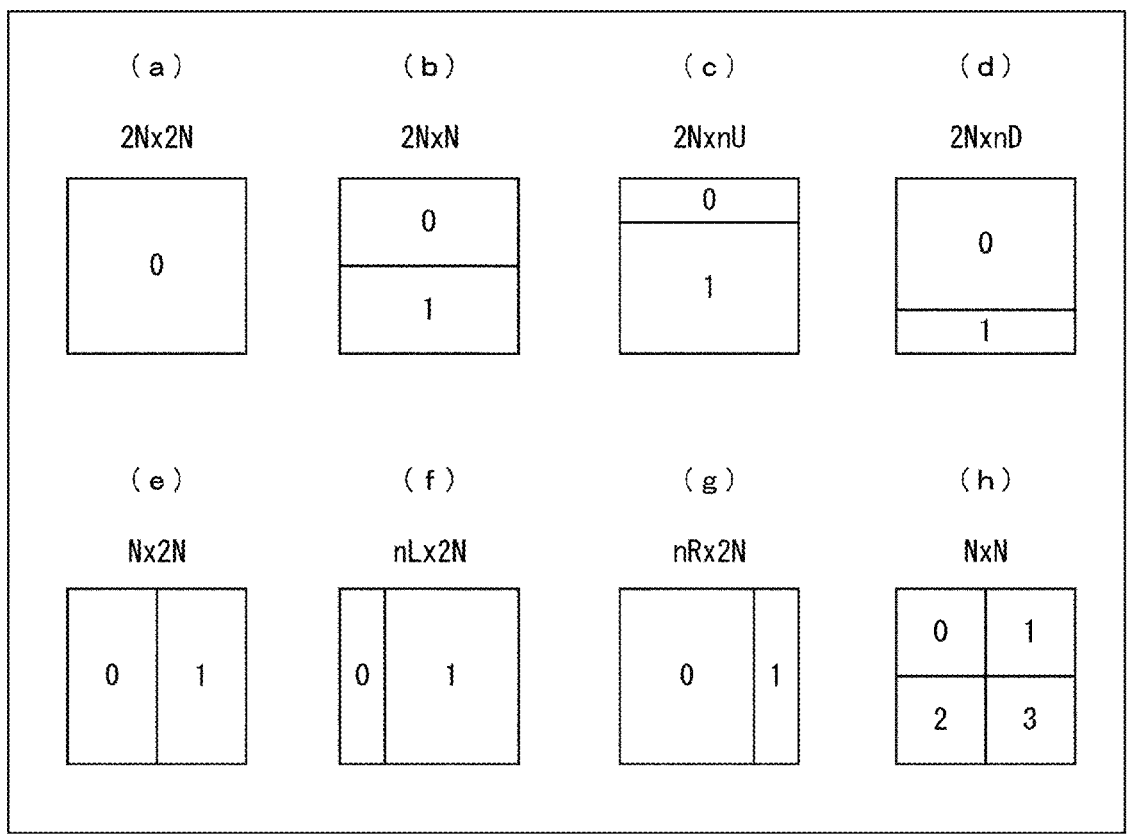
FIG. 2 is a diagram illustrating patterns for PU split modes. (a) to (h) respectively illustrate partition shapes in cases that the PU partition modes are 2N×2N, 2N×N, 2N×nU, 2N×nD, N×2N, nL×2N, nR×2N, and N×N.

In FIG. 2, (a) to (h) illustrate are shapes of partitions in respective PU split modes (positions of borders of PU split) specifically. In FIG. 2, (a) illustrates a partition of 2N×2N, and (b), (c), and (d) illustrate partitions (horizontally long partitions) of 2N×N, 2N×nU, and 2N×nD, respectively. In FIG. 2, (e), (f), and (g) illustrate partitions (vertically long partitions) in cases of N×2N, nL×2N, and nR×2N, respectively, and (h) illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be described below. The inter prediction parameter is constituted by prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

Figure 3:
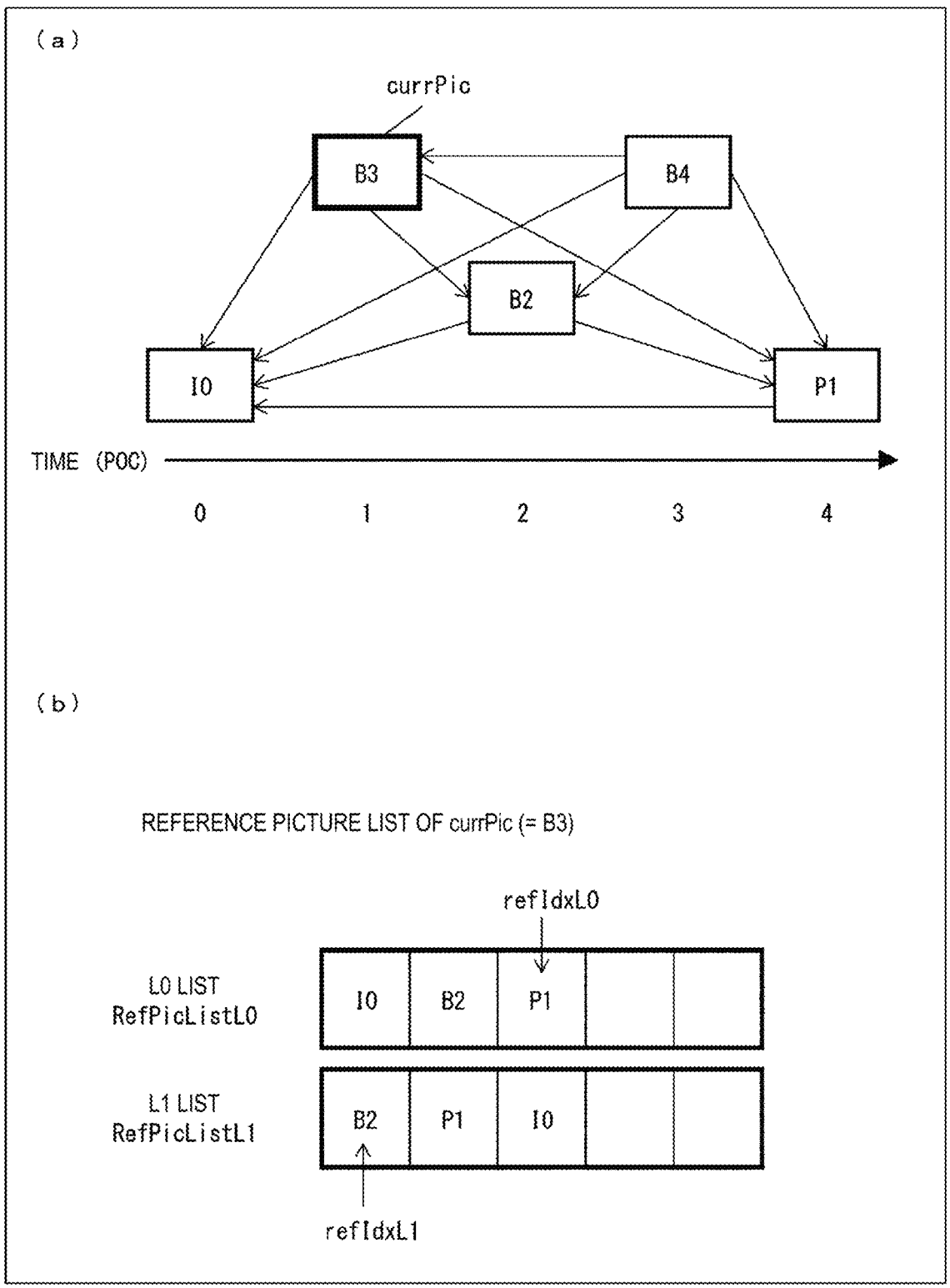
FIG. 3 is a conceptual diagram illustrating an example of reference pictures and reference picture lists.

A reference picture list is a list constituted by reference pictures stored in a reference picture memory 306. FIG. 3 is a conceptual diagram illustrating an example of reference pictures and reference picture lists. In FIG. 3(a), a rectangle represents a picture, an arrow represents a picture reference relationship, an abscissa represents time, characters "I", "P", and "B" in the rectangles represent an intra picture, a uni-prediction picture, and a bi-prediction picture, respectively, and a numeral in the rectangle represents a decoding order. As illustrated, the decoding order of the pictures is I0, P1, B2, B3, and B4, and the display order is I0, B3, B2, B4, and P1. FIG. 3(b) illustrates an example of the reference picture list. The reference picture list is a list to represent a candidate of a reference picture, and one picture (slice) may include one or more reference picture lists. In the illustrated example, a target picture B3 includes two reference picture lists, i.e., a L0 list RefPicList0 and a L1 list RefPicList1. In a case that a target picture is B3, the reference pictures are I0, P1, and B2, the reference picture includes these pictures as elements. For an individual prediction unit, which picture in a reference picture list RefPicListX is actually referred to is specified with a reference picture index refIdxLX. The diagram indicates an example where reference pictures P1 and B2 are referred to by refIdxL0 and refIdxL1.

Merge Prediction and AMVP Prediction

Decoding (coding) methods of prediction parameters include a merge prediction (merge) mode and an Adaptive Motion Vector Prediction (AMVP) mode, and merge flag merge_flag is a flag to identify these. The merge prediction mode is a mode to use to derive from prediction parameters of neighboring PUs already processed without including a prediction list utilization flag predFlagLX (or an inter prediction indicator inter_pred_idc), a reference picture index refIdxLX, and a motion vector mvLX in a coded data, and the AMVP mode is a mode to include an inter prediction indicator inter_pred_idc, a reference picture index refIdxLX, a motion vector mvLX in a coded data. Note that, the motion vector mvLX is coded as a prediction vector index mvp_LX_idx identifying a prediction vector mvpLX and a difference vector mvdLX.

The inter prediction indicator inter_pred_idc is a value indicating types and the number of reference pictures, and takes any value of PRED_L0, PRED_L1, and PRED_B1. PRED_L0 and PRED_L1 indicate to uses reference pictures managed in the reference picture list of the L0 list and the L1 list respectively, and indicate to use one reference picture (uni-prediction). PRED_B1 indicates to use two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a description method used in a case of not distinguishing the L0 prediction and the L1 prediction, and distinguishes parameters for the L0 list and parameters for the L1 list by replacing LX with L0 and L1.

The merge index merge_idx is an index to indicate to use either prediction parameter as a prediction parameter of a decoding target PU among prediction parameter candidates (merge candidates) derived from PUs of which the processing is completed.

Motion Vector

The motion vector mvLX indicates a gap quantity between blocks in two different pictures. A prediction vector and a difference vector related to the motion vector mvLX is referred to as a prediction vector mvpLX and a difference vector mvdLX respectively.

Inter Prediction Indicator Inter_Pred_Idc and Prediction List Utilization Flag predFlagLX A relationship between an inter prediction indicator inter_pred_idc and prediction list utilization flags predFlagL0 and predFlagL1 are as follows, and those can be converted mutually.

inter_pred_idc=(predFlagL1<<1)+predFlagL0 predFlagL0=inter_pred_idc&1 predFlagL1=inter_pred_idc>>1

Note that an inter prediction parameter may use a prediction list utilization flag or may use an inter prediction indicator. A determination using a prediction list utilization flag may be replaced with a determination using an inter prediction indicator. On the contrary, a determination using an inter prediction indicator may be replaced with a determination using a prediction list utilization flag.

Determination of Bi-Prediction biPred

A flag biPred of whether or not a bi-prediction BiPred can be derived from whether or not two prediction list utilization flags are both 1. For example, the flag can be derived by the following equation.

biPred=(predFlagL0==1&&predFlagL1==1)

The flag biPred can be also derived from whether an inter prediction indicator is a value indicating to use two prediction lists (reference pictures). For example, the flag can be derived by the following equation.

biPred=(inter_pred_idc==PRED_BI)?1:0

The above equation can be also expressed by the following equation.

biPred=(inter_pred_idc==PRED_BI)

Note that, for example, PRED_BI may have a value of 3.

Configuration of Image Decoding Apparatus

Figure 5:
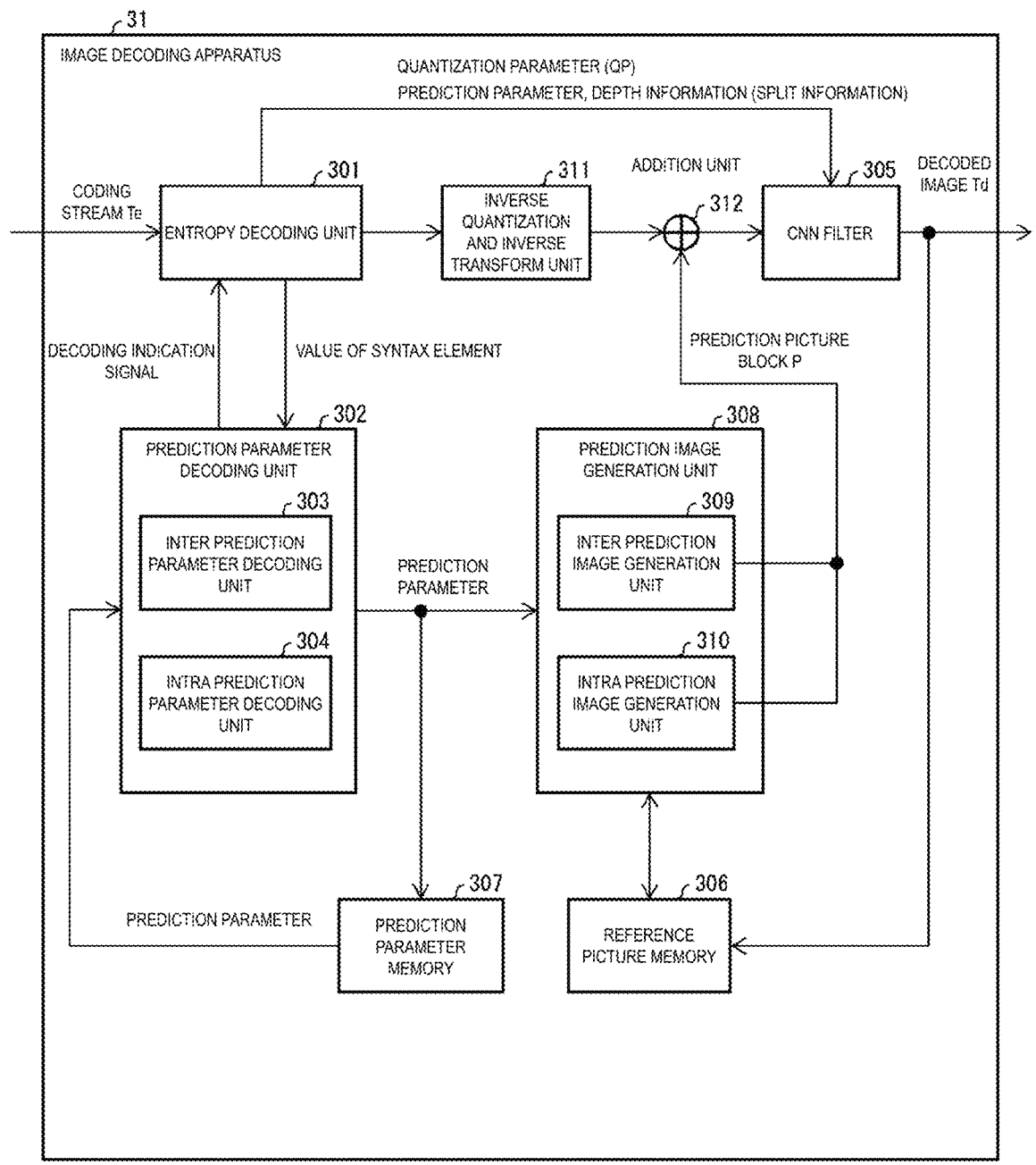
FIG. 5 is a schematic diagram illustrating a configuration of an image decoding apparatus according to the first embodiment.

Next, a configuration of the image decoding apparatus 31 according to the present embodiment will be described. FIG. 5 is a schematic diagram illustrating a configuration of the image decoding apparatus 31 according to the present embodiment. The image decoding apparatus 31 includes an entropy decoding unit 301, a prediction parameter decoding unit (prediction image decoding apparatus) 302, a Convolutional Neural Network (CNN) filter 305, a reference picture memory 306, a prediction parameter memory 307, a prediction image generation unit (prediction image generation apparatus) 308, an inverse quantization and inverse transform unit 311, and an addition unit 312.

The prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

The entropy decoding unit 301 performs entropy decoding on the coding stream Te input from the outside, and separates and decodes individual codes (syntax elements). Separated codes include prediction information to generate a prediction image and residual information to generate a differential image and the like.

The entropy decoding unit 301 outputs a part of the separated codes to the prediction parameter decoding unit 302. Examples of a part of the separated codes include a quantization parameter (QP), a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. The control of which code to decode is performed based on an indication of the prediction parameter decoding unit 302. The entropy decoding unit 301 outputs quantized coefficients to the inverse quantization and inverse transform unit 311. These quantized coefficients are coefficients obtained through quantization by performing, on the residual signal, frequency transform such as Discrete Cosine Transform (DCT), Discrete Sine Transform (DST), and Karyhnen Loeve Transform (KLT) in the coding processing.

The entropy decoding unit 301 outputs a part of the separated codes to the CNN filter 305 described later. Examples of a part of the separated codes include a quantization parameter (QP), a prediction parameter, and depth information (split information).

The inter prediction parameter decoding unit 303 decodes an inter prediction parameter with reference to a prediction parameter stored in the prediction parameter memory 307, based on a code input from the entropy decoding unit 301.

The inter prediction parameter decoding unit 303 outputs a decoded inter prediction parameter to the prediction image generation unit 308, and also stores the decoded inter prediction parameter in the prediction parameter memory 307.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in a processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

The intra prediction parameter decoding unit 304 may derive different intra prediction modes depending on luminance and chrominance. In this case, the intra prediction parameter decoding unit 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of a planar prediction (0), a DC prediction (1), directional predictions (2 to 34), and an LM mode (35). The intra prediction parameter decoding unit 304 may decode a flag indicating whether IntraPredModeC is a mode same as the luminance mode, assign IntraPredModeY to IntraPredModeC in a case of indicating that the flag is the mode same as the luminance mode, and decode a planar prediction (0), a DC prediction (1), directional predictions (2 to 34), and an LM mode (35) as IntraPredModeC in a case of indicating that the flag is a mode different from the luminance mode.

The CNN filter 305 acquires the quantization parameters and the prediction parameters from the entropy decoding unit 301, uses a decoded image of a CU generated by the addition unit 312 as an input image (unfiltered image), processes the unfiltered image, and outputs an output image (filtered image). The CNN filter 305 has functions similar to the CNN filter 107, described later, included in the image coding apparatus 11.

The reference picture memory 306 stores a decoded image of a CU generated by the addition unit 312 in a prescribed position for each picture and CU of a decoding target.

The prediction parameter memory 307 stores a prediction parameter in a prescribed position for each picture and prediction unit (or a sub-block, a fixed size block, and a pixel) of a decoding target. Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoding unit 301 is input, and a prediction parameter is input from the prediction parameter decoding unit 302. The prediction image generation unit 308 reads a reference picture from the reference picture memory 306. The prediction image generation unit 308 uses the input prediction parameters and the read out reference picture (reference picture block) to generate a prediction image of the PU or sub-block in the prediction mode indicated by the prediction mode predMode.

Here, in a case that the prediction mode predMode indicates the inter prediction mode, the inter prediction image generation unit 309 uses the inter prediction parameters input from the inter prediction parameter decoding unit 303 and the read out reference picture (reference picture block) to generate the prediction image of the PU or sub-block by the inter prediction.

For a reference picture list (an L0 list or an L1 list) where a prediction list utilization flag predFlagLX is 1, the inter prediction image generation unit 309 reads, from the reference picture memory 306, a reference picture block at a position indicated by a motion vector mvLX, based on a decoding target PU from reference pictures indicated by the reference picture index refIdxLX. The inter prediction image generation unit 309 performs a prediction based on a read reference picture block and generates a prediction image of a PU. The inter prediction image generation unit 309 outputs the generated prediction image of the PU to the addition unit 312. Here, the reference picture block is a set of pixels on the reference picture (the reason to be called a block is because it generally has a rectangle shape), and is an area referred to in order to generate the prediction image of the PU or sub-block.

In a case that the prediction mode predMode indicates an intra prediction mode, the intra prediction image generation unit 310 performs an intra prediction by using an intra prediction parameter input from the intra prediction parameter decoding unit 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range is, for example, any of adjacent PUs in left, top left, top, and top right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs the prediction in the prediction mode indicated by the intra prediction mode IntraPredMode based on the read out neighboring PU to generate the prediction image of the PU. The intra prediction image generation unit 310 outputs the generated prediction image of the PU to the addition unit 312.

In a case that the intra prediction parameter decoding unit 304 derives different intra prediction modes depending on luminance and chrominance, the intra prediction image generation unit 310 generates a prediction image of a PU of luminance by any of a planar prediction (0), a DC prediction (1), and directional predictions (2 to 34) depending on a luminance prediction mode IntraPredModeY, and generates a prediction image of a PU of chrominance by any of a planar prediction (0), a DC prediction (1), directional predictions (2 to 34), and LM mode (35) depending on a chrominance prediction mode IntraPredModeC.

The inverse quantization and inverse transform unit 311 dequantizes the quantized coefficients input from the entropy decoding unit 301 to find transform coefficients. The inverse quantization and inverse transform unit 311 performs inverse frequency transform such as inverse DCT, inverse DST, and inverse KLT on the found transform coefficients to compute a residual signal. The inverse quantization and inverse transform unit 311 outputs the computed residual signal to the addition unit 312.

The addition unit 312 adds the prediction image of the PU input from the inter prediction image generation unit 309 or intra prediction image generation unit 310 and the residual signal input from the inverse quantization and inverse transform unit 311 for each pixel to generate a decoded image of the PU. The addition unit 312 stores the generated decoded image of a PU in the reference picture memory 306, and outputs a decoded image Td where the generated decoded image of the PU is integrated for each picture to the outside.

Inter Prediction Image Generation Unit 309

Figure 7:
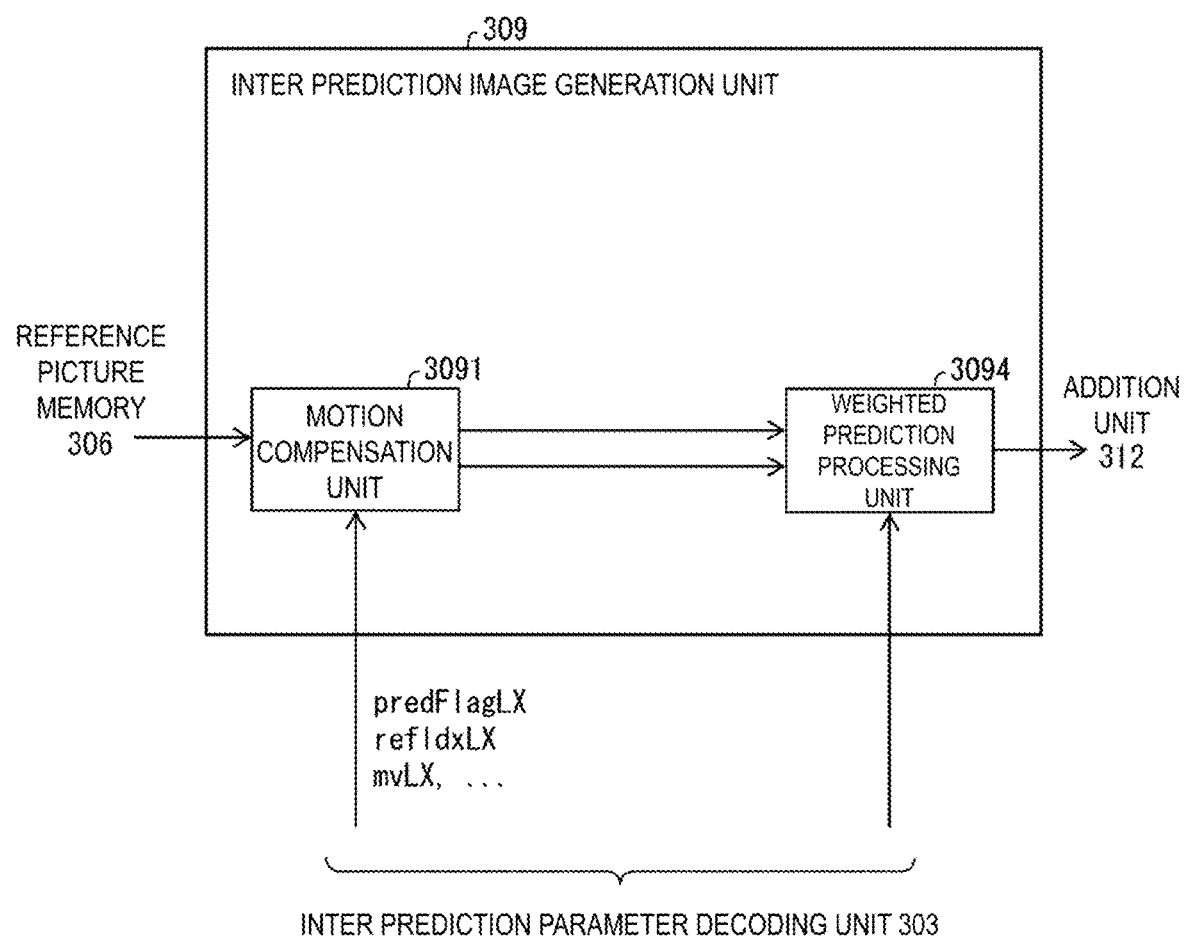
FIG. 7 is a schematic diagram illustrating a configuration of an inter prediction image generation unit of the image decoding apparatus according to the present embodiment.

FIG. 7 is a schematic diagram illustrating a configuration of the inter prediction image generation unit 309 included in the prediction image generation unit 308 according to the present embodiment. The inter prediction image generation unit 309 includes a motion compensation unit (prediction image generation device) 3091 and a weighted prediction processing unit 3094.

Motion Compensation

The motion compensation unit 3091 reads out from the reference picture memory 306 a block which is displaced by a motion vector mvLX from a starting point at a location of the decoding target PU in the reference picture RefX specified by the reference picture index refIdxLX, based on the inter prediction parameters input from the inter prediction parameter decoding unit 303 (such as the prediction list utilization flag predFlagLX, the reference picture index refIdxLX, and the motion vector mvLX) to generate an interpolation image (a motion compensation image predSamplesLX). Here, in a case that a precision of the motion vector mvLX is not an integer precision, a motion compensation image is generated by filtering called a motion compensation filter for generating a pixel at decimal position.

Weighted Prediction

The weighted prediction processing unit 3094 multiplies an input motion compensation image predSamplesLX by weight coefficients to generate a prediction image of the PU.

Configuration of Image Coding Apparatus

Figure 4:
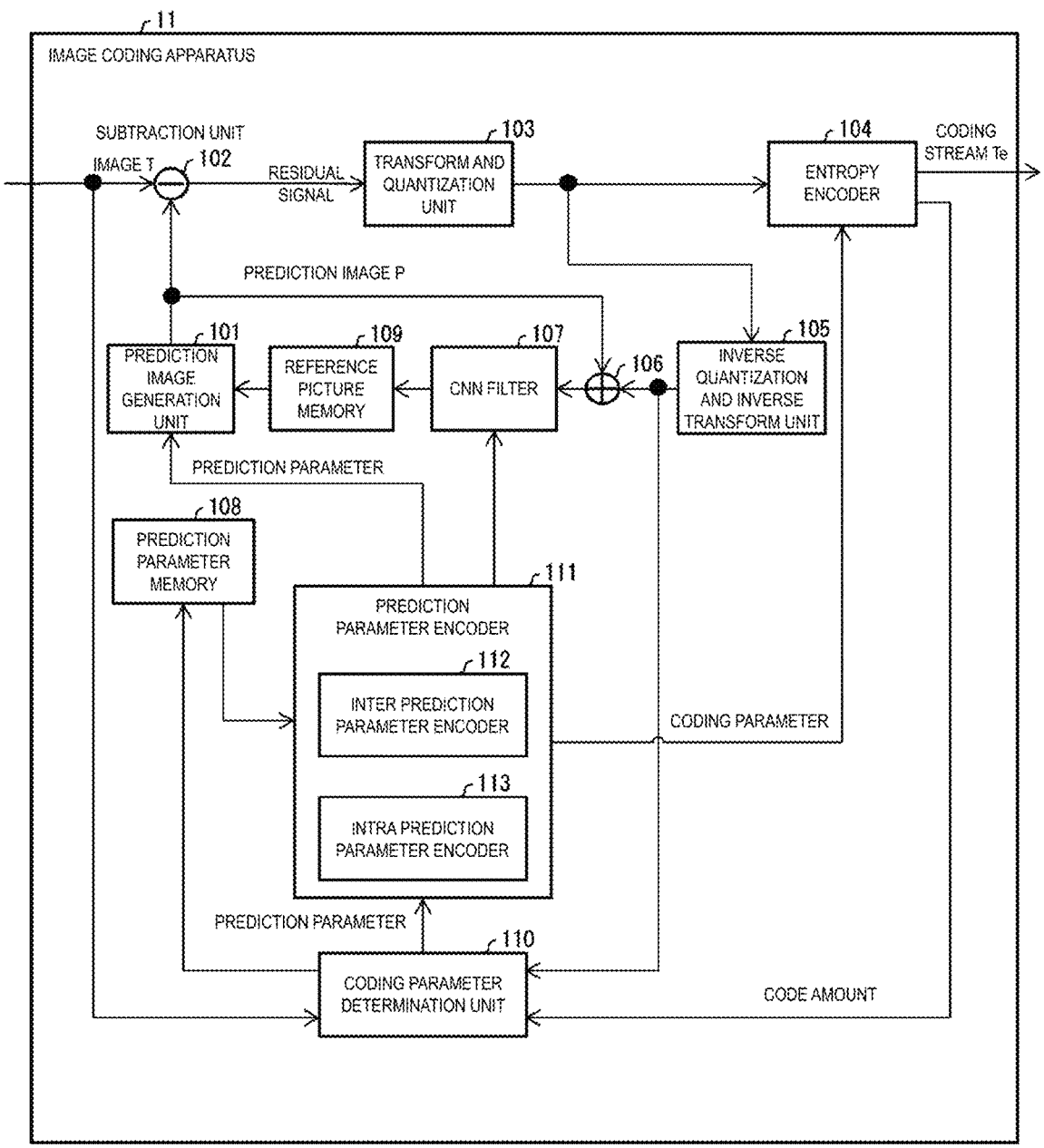
FIG. 4 is a block diagram illustrating a configuration of an image coding apparatus according to a first embodiment.

A configuration of the image coding apparatus 11 according to the present embodiment will now be described. FIG. 4 is a block diagram illustrating a configuration of the image coding apparatus 11 according to the present embodiment. The image coding apparatus 11 includes a prediction image generation unit 101, a subtraction unit 102, a transform and quantization unit 103, an entropy encoder 104, an inverse quantization and inverse transform unit 105, an addition unit 106, a Convolutional Neural Network (CNN) filter 107, a prediction parameter memory (prediction parameter storage unit, frame memory) 108, a reference picture memory (reference image storage unit, frame memory) 109, a coding parameter determination unit 110, and a prediction parameter encoder 111. The prediction parameter encoder 111 includes an inter prediction parameter encoder 112 and an intra prediction parameter encoder 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter encoder 111. For example, in a case of an inter prediction, the prediction parameter input from the prediction parameter encoder 111 is a motion vector. The prediction image generation unit 101 reads a block at a position in a reference image indicated by a motion vector starting from a target PU. In a case of an intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Figure 6:
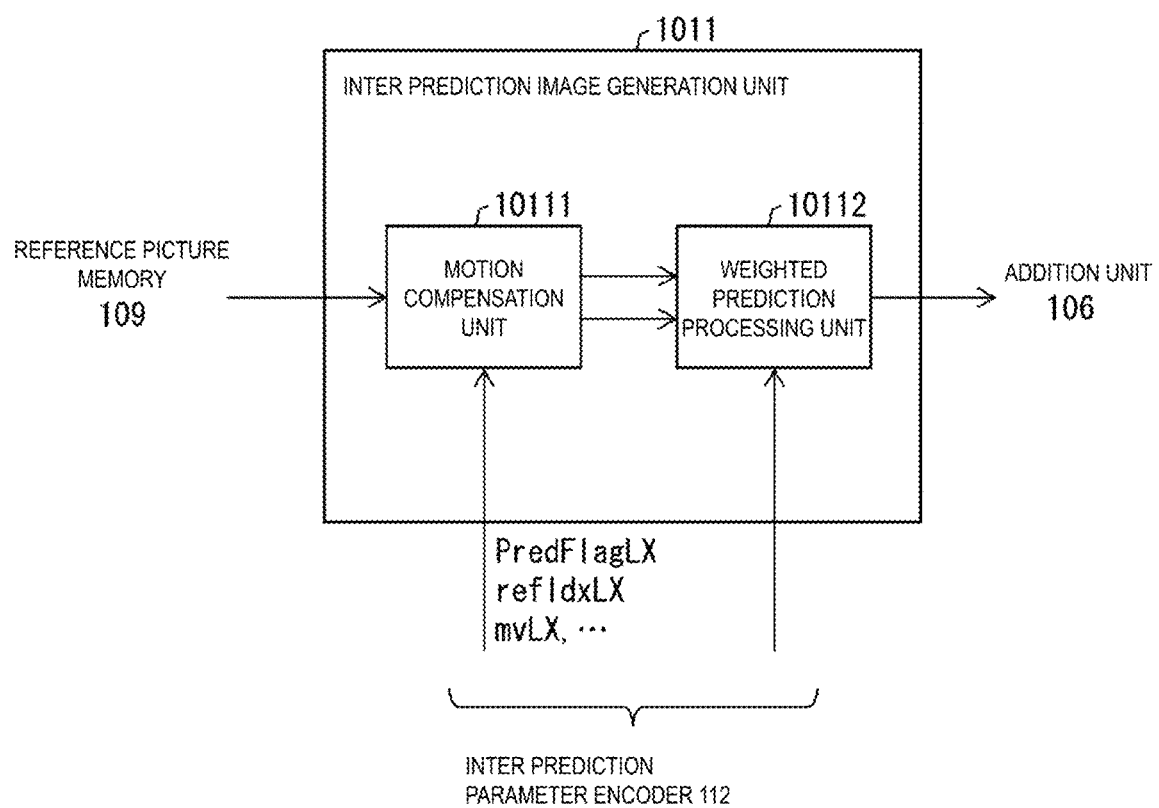
FIG. 6 is a schematic diagram illustrating a configuration of an inter prediction image generation unit of the image coding apparatus according to the present embodiment.

Note that the prediction image generation unit 101 is an operation same as the prediction image generation unit 308 already described. For example, FIG. 6 is a schematic diagram illustrating a configuration of an inter prediction image generation unit 1011 included in the prediction image generation unit 101. The inter prediction image generation unit 1011 includes a motion compensation unit 10111 and a weighted prediction processing unit 10112. Descriptions about the motion compensation unit 10111 and the weighted prediction processing unit 10112 are omitted since the motion compensation unit 10111 and the weighted prediction processing unit 10112 have configurations similar to each of the above-mentioned motion compensation unit 3091 and weighted prediction processing unit 3094, respectively.

The prediction image generation unit 101 generates the prediction image P of a PU, based on a pixel value of a reference block read from the reference picture memory, by using a parameter input by the prediction parameter encoder. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates a residual signal. The subtraction unit 102 outputs the generated residual signal to the transform and quantization unit 103.

The transform and quantization unit 103 performs frequency transform on the residual signal input from the subtraction unit 102 to compute transform coefficients. The transform and quantization unit 103 quantizes the computed transform coefficients to find quantized coefficients. The transform and quantization unit 103 outputs the found quantized coefficients to the entropy encoder 104 and the inverse quantization and inverse transform unit 105.

To the entropy encoder 104, input are the quantized coefficients from the transform and quantization unit 103 and the coding parameters from the prediction parameter encoder 111. Examples of the input coding parameters include the codes such as the quantization parameters, the depth information (split information), the reference picture index refIdxLX, the prediction vector index mvp_LX_idx, the difference vector mvdLX, the prediction mode predMode, and the merge index merge_idx.

The entropy encoder 104 performs entropy coding on the input quantized coefficients and coding parameters to generate the coding stream Te, and outputs the generated coding stream Te to the outside.

The inverse quantization and inverse transform unit 105 dequantizes the quantized coefficients input from the transform and quantization unit 103 to find transform coefficients. The inverse quantization and inverse transform unit 105 performs inverse frequency transform on the found transform coefficients to compute a residual signal. The inverse quantization and inverse transform unit 105 outputs the computed residual signal to the addition unit 106.

The addition unit 106 adds a signal value of the prediction image P of the PU input from the prediction image generation unit 101 and a signal value of the residual signal input from the inverse quantization and inverse transform unit 105 for each pixel to generate a decoded image. The addition unit 106 stores the generated decoded image in the reference picture memory 109.

Configuration of Image Filtering Apparatus

The CNN filter 107 is an example of an image filtering apparatus according to the present embodiment. The image filtering apparatus according to the present embodiment functions as a filter for acting on a local decoded image. The image filtering apparatus according to the present embodiment includes a neural network configured to receive an input of one or multiple first type input image data and one or multiple second type input image data, and output one or multiple first type output image data, the first type input image data having a pixel value of a luminance or chrominance, the second type input image data having a pixel value of a value corresponding to a reference parameter for generating a prediction image or a differential image, the first type output image data having a pixel value of a luminance or chrominance.

Here, the reference parameter herein is a parameter referenced to generate a prediction image and a differential image, and as an example, the coding parameter described above may be included. An example of the reference parameter is described in detail below.

- A quantization parameter in an image (hereinafter also referred to as an input image) on which the image filtering apparatus acts
- A parameter indicating types of intra prediction and inter prediction in an input image
- A parameter indicating an intra prediction direction in an input image (intra prediction mode)
- A parameter indicating a reference picture of inter prediction in an input image
- A parameter indicating a split depth of a partition in an input image
- A parameter indicating a size of a partition in an input image Note that the reference parameter may be referred to simply as a parameter unless the reference parameter is particularly confused. The reference parameter may also be explicitly transmitted in the coded data.

To the CNN filter 107, input as first type input image (unfiltered image) data is the decoded image data generated by the addition unit 106, and the CNN filter 107 processes the unfiltered image and outputs the first type output image (filtered image) data. The image filtering apparatus according to the present embodiment may acquire the quantization parameters and the prediction parameter as the second type input image data from the prediction parameter encoder 111 or the entropy decoding unit 301, and process the unfiltered image. Here, the output image after the filter by the image filtering apparatus is expected to match the original image as much as possible.

The image filtering apparatus has an effect of reducing a coding distortion, that is, a block distortion, and an effect of reducing a ringing distortion.

Here, the CNN is a generic term for a neural network having at least a convolutional layer (a layer whose weight coefficient and bias/offset in the product-sum operation does not depend on a position within a picture). The weight coefficient is also referred to as a kernel. The CNN filter 107 may include a layer whose weight computation depends on the position in the picture, referred to as full connection layer (FCN), in addition to the convolutional layer. The CNN filter 107 may also include a Locally Connected Networks (LCN) layer in which neurons belonging to the layer only connect with some inputs of the layer (in other words, the neurons have spatial locations and connect only to inputs that are close to spatial locations). In the CNN filter 107, an input size to the convolutional layer may be different from an output size. That is, the CNN filter 107 may include a layer in which the output size is smaller than the input size by setting an amount of movement (step size) to be greater than one in a case of moving the position at which a convolutional filter is applied. The CNN filter 107 may include a deconvolutional layer (Deconvolution) in which an output size is larger than an input size. The deconvolutional layer may be referred to as a transposed Convolution. The CNN filter 107 can also include a pooling layer (Pooling), a DropOut layer, and the like. The pooling layer is a layer for dividing a large image into small windows to obtain a representative value such as a maximum value and an average value in accordance with each of the divided windows, and the dropout layer is a layer for adding randomness by setting the output to a fixed value (for example, 0) according to the probability.

Figure 8:
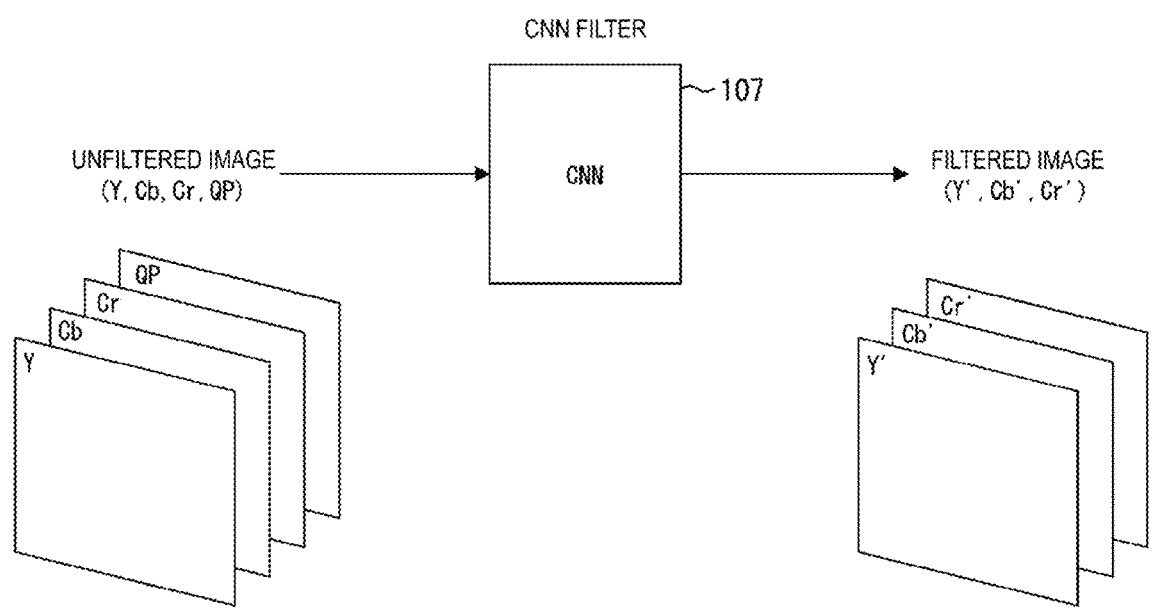
FIG. 8 is a conceptual diagram illustrating an example of input and output of an image filtering apparatus according to the first embodiment.

FIG. 8 is a conceptual diagram illustrating an example of the input and output of the CNN filter 107. In the example illustrated in FIG. 8, the unfiltered image includes three image channels including a channel of a luminance (Y), a channel of a first chrominance (Cb), and a channel of a second chrominance (Cr), and one coding parameter (reference parameter) channel including a channel of a quantization parameter (QP). The filtered image also includes three image channels including a channel of a processed luminance (Y'), a channel of a processed chrominance (Cb'), and a channel of a processed chrominance (Cr').

Figure 34:
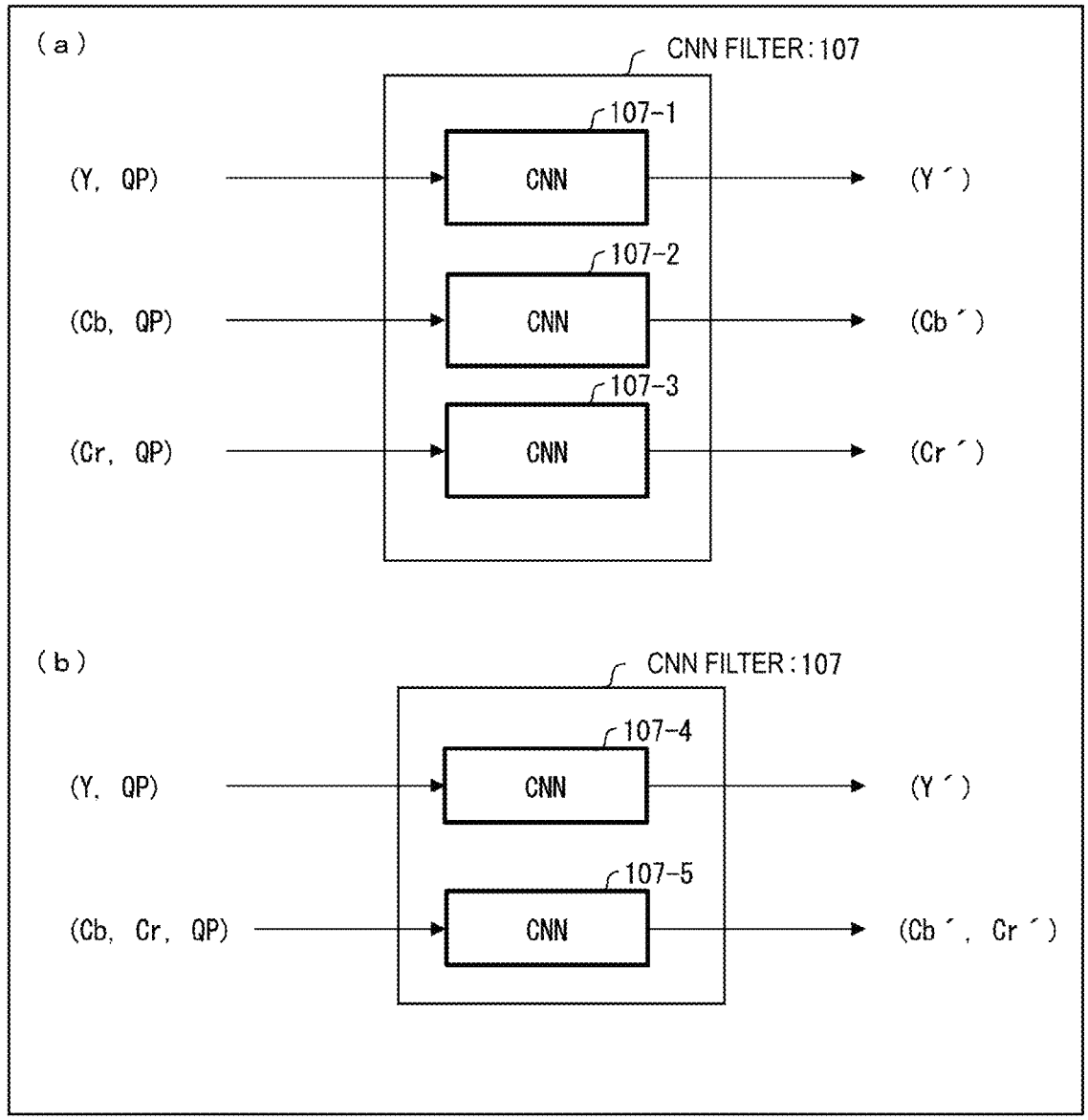
FIG. 34 is a conceptual diagram illustrating another example of input and output of the image filtering apparatus according to the first embodiment.

Note that FIG. 8 is an example of the input and output of the CNN filter 107, and, for example, a configuration in which the Y (luminance), first chrominance (Cb), and second chrominance (Cr) of the unfiltered image are separately input into respective channels is included in the configuration according to the present embodiment, of course. Furthermore, a configuration in which the Y (luminance), first chrominance (Cb), and second chrominance (Cr) of the unfiltered image are separately input into respective channels is included in the configuration according to the present embodiment, of course. The input unfiltered image is not limited to the channels of Y, Cb, and Cr, and may be, for example, channels of R, G, and B, channels of X, Y, and Z, and channels of CMYK. The channels using luminance and chrominance are not limited to Y, Cb, and Cr, and may be channels designated by, for example, Y, U, and V, Y, Pb, and Pr, Y, Dz, and Dx, and I, Ct, and Cp. FIG. 34 is a conceptual diagram illustrating another example of the input and output of the CNN filter 107.

In (a) of FIG. 34, the unfiltered image is separated into a channel of the luminance (Y) and quantization parameter (QP), a channel of the first chrominance (Cb) and quantization parameter (QP), and a channel of the second chrominance (Cr) and quantization parameter (QP), and input into the CNN filter 107. The CNN filter 107 includes a CNN filter 107-1 that processes the channel of the luminance (Y) and quantization parameter (QP) to output (Y'), a CNN filter 107-2 that processes the channel of the first chrominance (Cb) and quantization parameters (QP) to output (U'), and a CNN filter 107-3 that processes the channel of the second chrominance (Cr) and quantization parameters (QP) to output (V'). Note that the reference parameter (coding parameter) is not limited to the quantization parameter (QP), and one or more coding parameters may be used. The CNN filter 107 is also not limited to the configuration including the CNN filter 107-1, the CNN filter 107-2, and the CNN filter 107-3 which are configured using different measures (circuits and software). For example, the CNN filter 107 may be configured by one of multiple different means (circuits or software) and then operate in different modes.

In (b) of FIG. 34, the unfiltered image is separated into a channel of the luminance (Y) and quantization parameter (QP), and a channel of the first chrominance (Cb), second chrominance (Cr), and quantization parameter (QP), and input into the CNN filter 107. The CNN filter 107 includes a CNN filter 107-4 that processes the channel of the luminance (Y) and quantization parameter (QP) to output (Y'), and a CNN filter 107-5 that processes the channel of the first chrominance (Cb), second chrominance (Cr), and quantization parameters (QP) to output (U', V'). Note that the reference parameter (coding parameter) is not limited to the quantization parameter (QP), and one or more coding parameters may be used. The CNN filter 107 is also not limited to the configuration including the CNN filter 107-4 and the CNN filter 107-5 which are configured using different means (circuits and software). For example, the CNN filter 107 may be configured by one of multiple different means (circuits or software) and then operate in different modes. This configuration is used in a case of processing an image (input) in which the luminance and the reference parameter are interleaved, and processing an image (input) in which the first chrominance, the second chrominance, and the reference parameter are interleaved.

In the configuration illustrated in (b) of FIG. 34, the processing of the luminance (Y) and the processing of the chrominance (processing of the channel in which the first chrominance (Cb) and the second chrominance (Cr) are interleaved) are processed in different CNN filters 107. In this configuration, even in a case that a resolution of the luminance (Y) is different from a resolution of the first chrominance (Cb) and second chrominance (Cr), an amount of computation does not increase in the interleaving of the first chrominance (Cb) and the second chrominance (Cr). Since the CNN filter 107 can separately process the luminance (Y) and the chrominance (the first chrominance (Cb) and the second chrominance (Cr)), parallel processing of the luminance and the chrominance is possible. Since the first chrominance, the second chrominance, and the coding parameter are simultaneously available in a case that the amount of information increases, that is, the chrominance is processed, so the accuracy of the CNN filter 107 can be increased in the configuration illustrated in (b) of FIG. 34.

Figure 9:
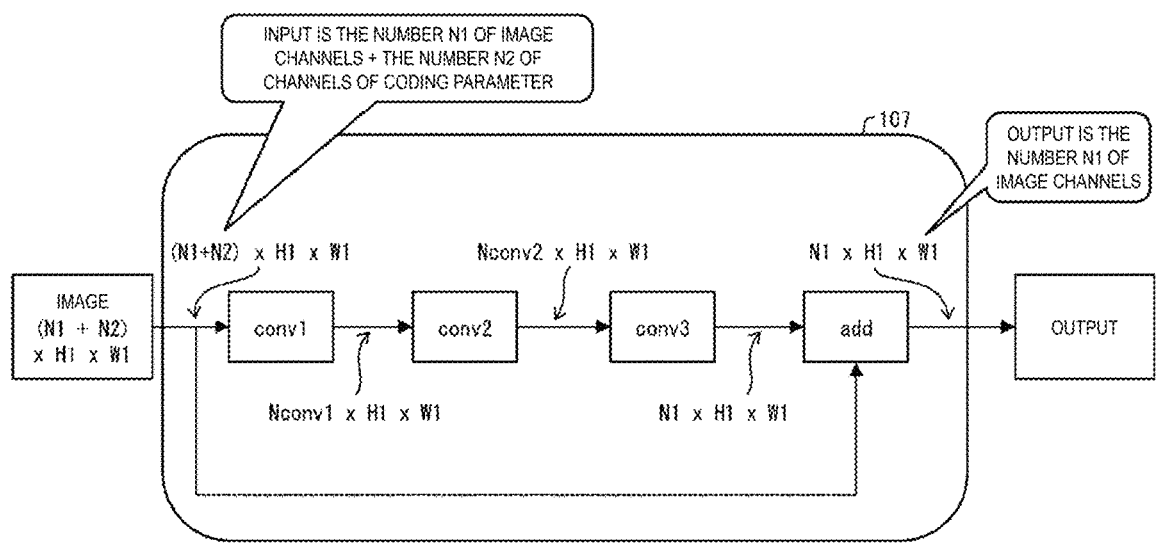
FIG. 9 is a schematic diagram illustrating a configuration of the image filtering apparatus according to the first embodiment.

FIG. 9 is a schematic diagram illustrating an example of a configuration of the CNN filter 107 according to the present embodiment. The CNN filter 107 includes multiple convX layers.

Here, in the present embodiment, the convX layer can include at least any one of the following configurations.

(1) conv(x): a configuration for performing filtering (convolution)

(2) act(conv(x)): a configuration for performing activation (non-linear function, e.g. sigmoid, tanh, relu, elu, selu, etc.) after convolution (3) batch_norm(act(conv(x))): a configuration for performing batch normalization (normalization of input range) after convolution and activation (4) act(batch_norm(conv(x))): a configuration for performing batch normalization (normalization of input range) between convolution and activation (5) pooling: a configuration for performing compression and downsizing of information between the conv layers The CNN filter 107 may include at least one of the following layers in addition to the convX layer.

(5) pooling: a configuration for performing compression and downsizing of information between the conv layers (6) add/sub: a configuration for adding in units of an element (including the configuration for subtracting)

(7) concatenate/stack: a configuration for stacking multiple inputs to form a new large input (8) fcn: a configuration for performing fully-connected filter (9) lcn: a configuration for performing locally-connected filter In the example illustrated in FIG. 9, the CNN filter 107 includes three convX layers (conv1, conv2, conv3) and an add layer. The input unfiltered image has a size of (N1+N2)×H1×W1. Here, N1 represents the number of image channels. For example, in a case that the unfiltered image only includes the channel of the luminance (Y), N1 is "1". In a case that the unfiltered image includes the channels of Y, Cb, and Cr, N1 is "3". In a case that the unfiltered image includes the channels of R, G, and B, N1 is "3". W1 represents a width patch size of the picture and H1 represents a height patch size of the picture. N2 represents the number of channels of the coding parameter. For example, in a case that the coding parameter includes only the channel of the quantization parameter (QP), N2 is "1". The configuration provided with the add layer is a configuration for predicting a differential (residual) between the filtered image and the unfiltered image by the CNN filter, and is known to be particularly effective in a configuration in which the CNN layer is deep. Note that the add layer is not limited to one, and multiple add layers may be provided, as it is known that a configuration in which multiple layers for deriving the residual are stacked is referred to as a ResNet.

As described later, the network may include a branch, and may also include a Concatenate layer for bundling branched input and output. For example, concatenate the data of N1×H1×W1 and the data of N2×H1×W1, for example, resulting in data of (N1+N2)×H1×W1.

To the first conv layer conv1 of the CNN filter 107, data of (N1+N2)×H1×W1 is input, and the conv layer conv1 outputs data of Nconv1×H1×W1. To the second cony layer conv2 of the CNN filter 107, data of Nconv1×H1×W1 is input, and the conv layer conv2 outputs data of Nconv2×H1×W1. To the third conv layer conv3 of the CNN filter 107, data of Nconv2×H1×W1 is input, and the conv layer conv3 outputs data of N1×H1×W1. In an add layer add, the data of N1×H1×W1 output from the conv layer and the unfiltered image of N1×H1×W1 are added for each pixel, and the add layer add outputs data of N1×H1×W1.

As illustrated in FIG. 9, the number of picture channels is reduced from N1+N2 to N1 through processing by the CNN filter 107. Note that in the present embodiment, the CNN filter 107 may perform the process in a data format of channel first (channel×height×width), but may perform the process in a data format of channel last (height×width×channel).

Note that the CNN filter 107 may be provided with an autoencoder layer that decreases the output size by the convolutional layer and then increases the output size by the deconvolutional layer and returns to original size. A deep network including multiple convolutional layers may be referred to as a Deep Neural Network (DNN). The image filtering apparatus may also include a Recurrent Neural Network (RNN) to cause a portion of the output of the network to be again input to the network. In the RNN, the information to be again input can be considered as an internal state of the network.

The image filtering apparatus may further combine, as components, multiple Long Short-Term Memories (LSTM) or Gated Recurrent Units (GRU) using a sub-network of the neural network to control updating and transmission of re-input information (internal state).

In addition to the channel of the quantization parameter (QP), a channel of the split information (PartDepth) and a channel of the prediction mode information (PredMode) can be added as a channel of the coding parameter for the unfiltered image.

Quantization Parameter (QP)

The quantization parameter (QP) is a parameter that controls an image compression rate and an image quality. In the present embodiment, the quantization parameter (QP) has a characteristic in which the higher the value, the lower the image quality and the smaller a code amount, and a characteristic in which the lower the value, the higher the image quality and the larger the code amount. As the quantization parameter (QP), for example, a parameter that derives a quantization step size of the prediction residual can be used.

As the quantization parameter (QP) in the picture units, one representative quantization parameter (QP) for the processing target frame can be input. For example, the quantization parameter (QP) can be specified by a parameter set applied to a target picture. The quantization parameter (QP) can also be calculated based on quantization parameters (QP) applied to components of the picture. Specifically, the quantization parameter (QP) may be calculated based on an average value of quantization parameters (QP) applied to the slices.

As the quantization parameter (QP) in units obtained by splitting the picture, a quantization parameter (QP) in each of units obtained by splitting the picture on a prescribed basis can be input. For example, the quantization parameter (QP) may be applied for each slice. The quantization parameter (QP) may also be applied to blocks in the slice. The quantization parameter (QP) may also be specified in units of regions independent of existing coding units (e.g., regions obtained by splitting the picture into 16×9 pieces). In this case, since the quantization parameters (QP) depend on the number of slices and the number of transform units, the value of the quantization parameter (QP) corresponding to the region is indeterminate, and the CNN filter cannot be configured, and therefore, a method can be conceivable in which the average value of the quantization parameters (QP) in the region is used as a representative value. Some methods also use a quantization parameter (QP) at a single position in the region as a representative value. Some methods also use a median or mode of the quantization parameters (QP) at multiple positions in the region are used as representative values.

In a case that the specific number of quantization parameters (QP) are input, a list of quantization parameters (QP) may be generated and input to the CNN filter such that the number of quantization parameters (QP) is constant. For example, a method is conceivable in which a list of quantization parameters (QP) for each slice is created, and a list of three quantization parameters (QP) of maximum value, minimum value, and median is created and input.

The quantization parameters (QP) to be applied to processing target components may be input as the quantization parameters (QP) in component units. Examples of this quantization parameter (QP) may include luminance quantization parameters (QP) and chrominance quantization parameters (QP).

In a case of applying an CNN filter in units of a block, quantization parameters (QP) of the target block and quantization parameters (QP) around the block may be input as the peripheral quantization parameters (QP).

The CNN filter 107 may be designed according to a picture and coding parameters. That is, because the CNN filter 107 can be designed not only in accordance with the picture characteristics that can be derived from image data such as directionality, activity, etc., but also in accordance with the coding parameters, the CNN filter 107 may implement filters having different intensities for each coding parameter. Accordingly, since the present embodiment includes the CNN filter 107, processing can be performed in accordance with the coding parameters without introducing different networks for each coding parameter.

Figure 10:
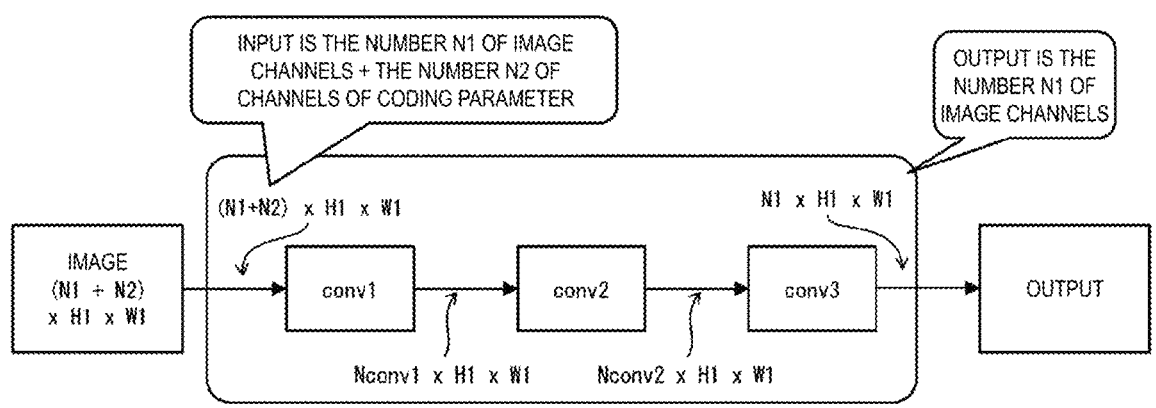
FIG. 10 is a schematic diagram illustrating a modification example of the configuration of the image filtering apparatus according to the first embodiment.

FIG. 10 is a schematic diagram illustrating a modification example of the configuration of the image filtering apparatus according to the present embodiment. As illustrated in FIG. 10, the image filtering apparatus that is a CNN filter may not include an add layer but may include only a convX layer. In this modification example also, which does not include an add layer, the CNN filter outputs the data of N1*H1*W1.

Figure 11:
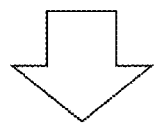
FIG. 11 is a diagram illustrating an example of a quantization parameter.

Referring to FIG. 11, an example in which the reference parameter is a quantization parameter (QP) will be described. The quantization parameters (QP) illustrated in (a) of FIG. 11 are arranged in unit regions of the transform unit (or in unit regions in each of which the quantization parameters (QP) are the same). In (b) of FIG. 11, a case is illustrated that the quantization parameters (QP) illustrated in (a) of FIG. 11 are input in the unit regions such as pixels, for example. In the case of inputting in units of a pixel, the quantization parameter (QP) corresponding directly to each pixel can be used for processing, and processing can be performed in accordance with each pixel. A transform unit border is found from a change position of the quantization parameter (QP), so that information on whether the pixel is within the same transform unit or in an adjacent different transform unit can be utilized in the filtering process. Magnitudes of the change in the pixel value as well as the change in the quantization parameter (QP) can be utilized. For example, information can be utilized, such as on whether the quantization parameters (QP) are flat, slowly changing, abruptly changing, or continuously changing. The quantization parameter before being input to the CNN filter 107 may be normalized or standardized so as to be closer to an average value 0 or a distribution 1. This is the same for the coding parameters and the pixel values other than quantization parameters.

Figure 12:
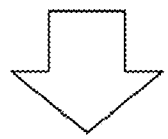
FIG. 12 is a diagram illustrating an example of a prediction parameter.

FIG. 12 illustrates an example of a case that the reference parameter is a prediction parameter. The prediction parameter includes information indicating intra prediction or inter prediction, and a prediction mode indicating the number of reference pictures used for prediction in the case of the inter prediction.

The prediction parameters illustrated in (a) of FIG. 12 are arranged in units of a coding unit (prediction unit). In (b) of FIG. 12, a case is illustrated that the prediction parameters illustrated in (a) of FIG. 12 are input in the unit regions such as pixels. In the case of inputting in units of a pixel similarly to the example illustrated in (b) of FIG. 11, the prediction parameter corresponding spatially directly to each pixel can be used for processing, and processing can be performed in accordance with each pixel. In other words, a prediction parameter at coordinates (x, y) can be utilized at the same time as (R, G, B) and (Y, Cb, Cr) which are the pixel values of coordinates (x, y). A coding unit border is found from a change position of the prediction parameter, so that information on whether the pixel is within the same coding unit or in an adjacent different coding unit can be utilized in the filtering process. Magnitudes of the change in the pixel value as well as the change in the prediction parameter can be utilized. For example, information can be utilized, such as on whether the prediction parameters are flat, slowly changing, abruptly changing, or continuously changing. Note that the value assigned to the prediction parameter is not limited to the example of the number illustrated in (b) of FIG. 12 as long as the value is assigned a value close to the prediction mode of the near property. For example, "−2" may be assigned to the intra prediction, "2" may be assigned to uni-prediction, and "4" may be assigned to bi-prediction.

Figure 13:
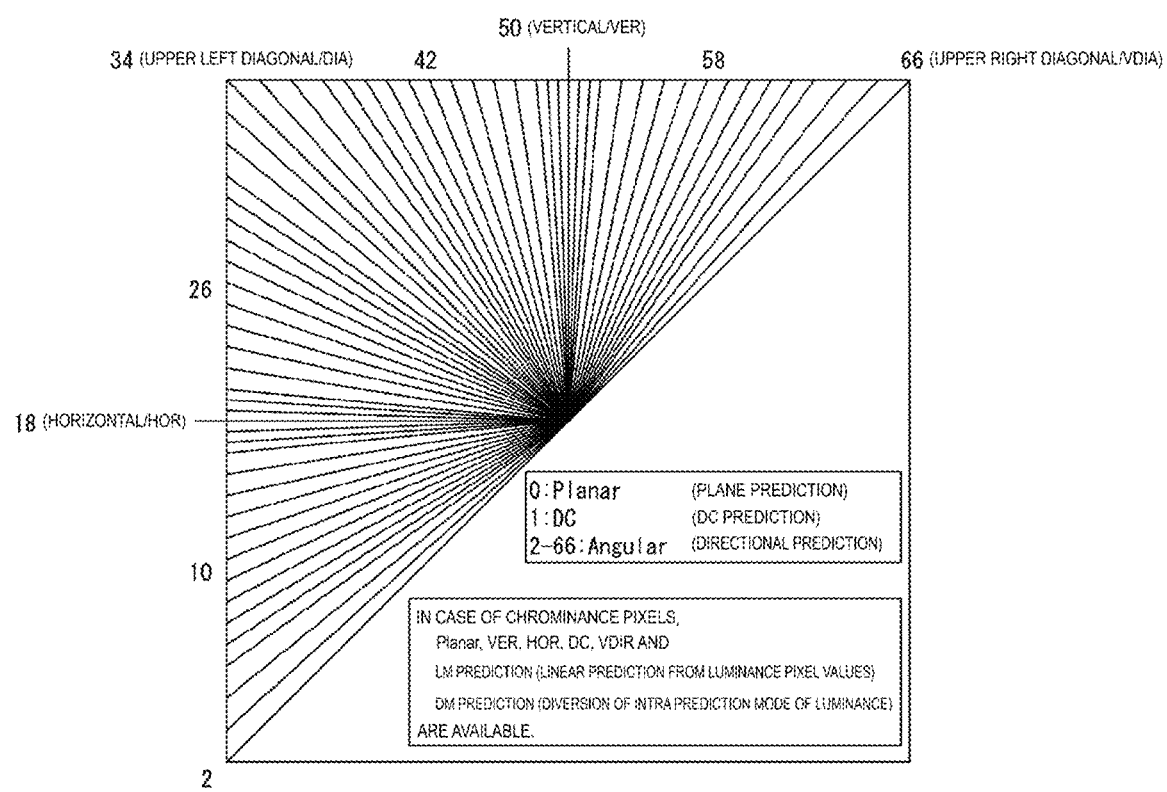
FIG. 13 is a diagram illustrating an example of intra prediction.

The definition of the prediction mode for an intra prediction will be described with reference to FIG. 13. FIG. 13 illustrates a definition of the prediction mode. As illustrated in the figure, 67 types of prediction modes are defined for luminance pixels, and the respective prediction modes are identified by numbers (intra prediction mode indexes) "0" to "66". The respective prediction modes are assigned with names as follows. That is, "0" identifies "Planar (planar prediction)", "1" identifies "DC (DC prediction)", and "2" to "66" identify "Angular (directional prediction)". In a case of chrominance pixels, "Planar (planar prediction)", "VER (vertical prediction)", "HOR (horizontal prediction)", "DC (DC prediction)", "VDIR (45-degree prediction)", LM prediction (chrominance prediction mode), and DM prediction (diversion of luminance intra prediction mode) are available. The LM prediction is a linear prediction of the chrominance based on the luminance prediction. In other words, the LM prediction is a prediction using a correlation between the luminance pixel value and the chrominance pixel value.

Figure 14:
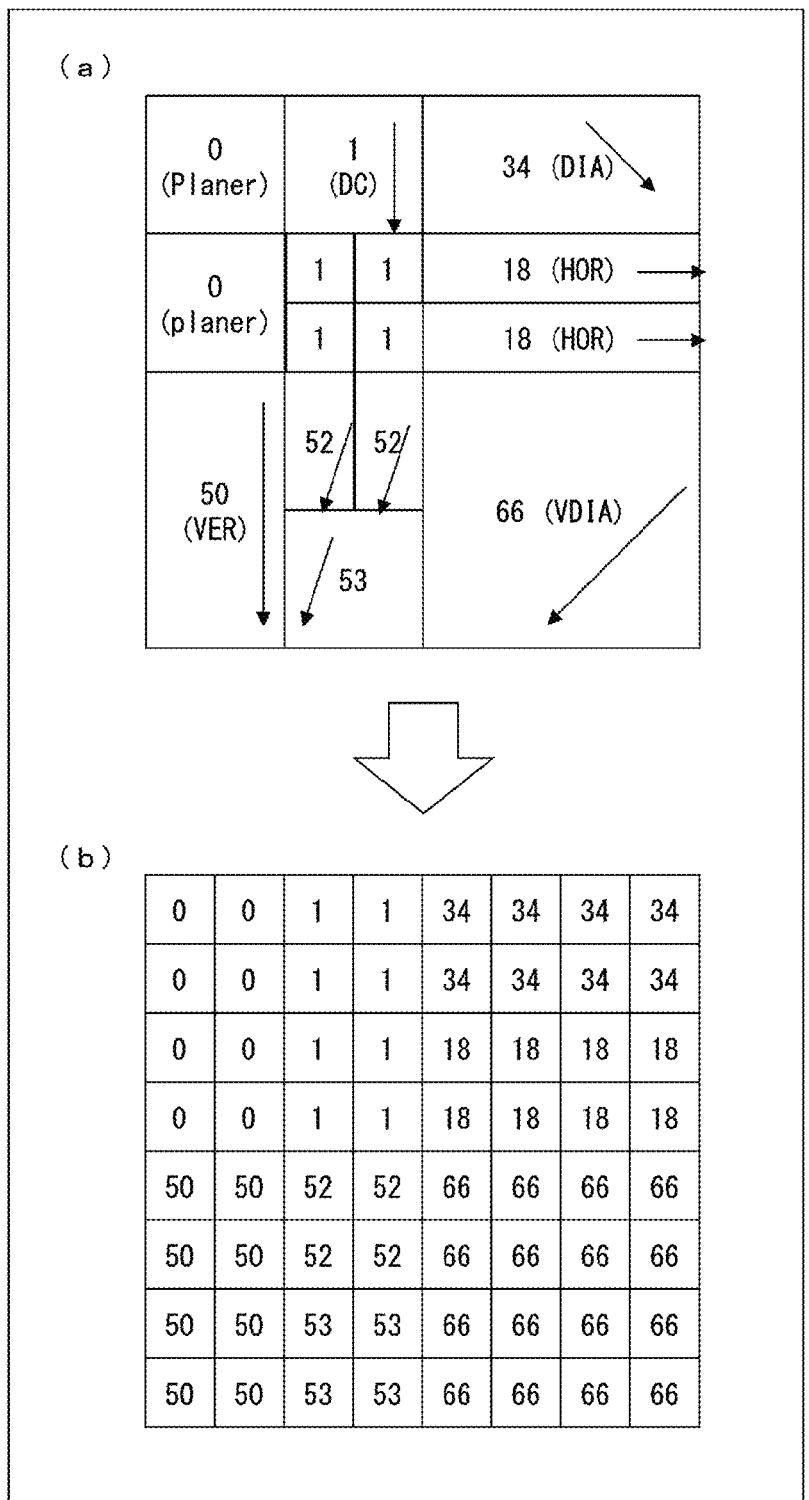
FIG. 14 is a diagram illustrating an example of an intra prediction parameter.

FIG. 14 illustrates an example of a case that the reference parameter is an intra prediction parameter of a luminance pixel. The intra prediction parameter includes a value of a prediction parameter determined for each of the partitions. The intra prediction parameter can include, for example, an intra prediction mode.

The intra prediction parameters illustrated in (a) of FIG. 14 are arranged in units of a coding unit (prediction unit). In (b) of FIG. 14, a case is illustrated that the prediction parameters illustrated in (a) of FIG. 14 are input in the unit regions such as pixels. In the case of inputting in units of a pixel similarly to the example illustrated in (b) of FIG. 11, the intra prediction parameter corresponding directly to each pixel can be used for processing, and processing can be performed in accordance with each pixel. A coding unit border is found from a change position of the intra prediction parameter, so that information on whether the pixel is in the same coding unit or in an adjacent different coding unit can be utilized. Magnitudes of the change in the pixel value as well as the change in the intra prediction parameter can be utilized. For example, information can be utilized, such as on whether the intra prediction parameters are slowly changing, abruptly changing, or continuously changing.

Figure 15:
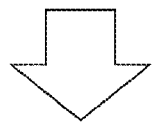
FIG. 15 is a diagram illustrating an example of split depth information.

FIG. 15 illustrates an example of a case that the reference parameter is depth information (split information). The depth information depends on the transform unit for each partition. The depth information is determined, for example, in accordance with the number of splits of the coding unit, and corresponds to a size of the coding unit.

The depth information illustrated in (a) of FIG. 15 is arranged in units of a coding unit (in units of a prediction unit). In (b) of FIG. 15, a case is illustrated that the depth information illustrated in (a) of FIG. 15 is input in the unit regions such as pixels. In the case of inputting in units of a pixel similarly to the example illustrated in (b) of FIG. 11, the depth information corresponding directly to each pixel can be used for processing, and processing can be performed in accordance with each pixel. A coding unit border is found from a change position of the depth information, so that information on whether the pixel is in the same coding unit or in an adjacent different coding unit can be utilized. Magnitudes of the change in the pixel value as well as the change in the depth information can be utilized. For example, information can be utilized, such as on whether the depth information is slowly changing, abruptly changing, or continuously changing.

Size information indicating the horizontal size and vertical size of the partition may be used instead of the depth information.

Figure 16:
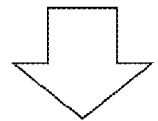
FIG. 16 is a diagram illustrating another example of the split depth information.

FIG. 16 illustrates an example of a case that the reference parameter is the size information including the horizontal size and vertical size of the partition. In the example illustrated in FIG. 16, two information, i.e., the information of horizontal size and the information of horizontal size vertical size, are input for each unit region. In the example of FIG. 16, log 2(W)−2 and log 2(H)−2 are used for the reference parameter, which are obtained by adding an offset (−2) to two logarithmic values of a horizontal size W (width) and a vertical size H (height) of the partition. For example, the partition sizes (W, H) of (1, 1), (2, 1), (0, 0), (2, 0), (1, 2), and (0, 1) are (8, 8), (16, 8), (4, 4), (16, 4), (8, 16), and (4, 8), respectively.

Each partition size in the example illustrated in FIG. 16 may be considered as a value (3−log 2(D)) obtained by subtracting two logarithmic values of values D representing the numbers of horizontal and vertical splits of the transform unit from a prescribed value.

The size information illustrated in (a) of FIG. 16 is arranged in units of a transform block. In (b) of FIG. 16, a case is illustrated that the size information illustrated in (a) of FIG. 16 is input in the unit regions such as pixels. In the example illustrated in (b) of FIG. 16 also, the same effects as those illustrated in (b) of FIG. 15 are achieved.

Figure 17:
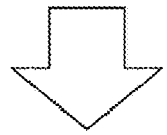
FIG. 17 is a diagram illustrating another example of the prediction parameter.

FIG. 17 illustrates another example of a case that the coding parameter includes multiple prediction parameters. In the example illustrated in FIG. 17, in addition to the prediction mode, reference picture information is included in the prediction parameter.

The prediction parameters illustrated in (a) of FIG. 17 are arranged in units of a transform block. In (b) of FIG. 17, a case is illustrated that the prediction parameters illustrated in (a) of FIG. 17 are input in the unit regions such as pixels. In the example illustrated in (b) of FIG. 17, the same effects as those illustrated in (b) of FIG. 12 are achieved.

CNN Filter Training Method

The CNN filter 107 is trained using training data and error functions.

As the training data for the CNN filter 107, a set of unfiltered images, reference parameters, and original images described above can be input. The filtered image output from the CNN filter 107 is expected to minimize an error from the original image under a certain reference parameter.

As an error function for the CNN filter 107, a function evaluating an error between the filtered image applied with the filtering process by the CNN filter 107 and the original image (for example, a mean absolute error or a mean square error) can be used as an error function of the CNN filter 107. In addition to the error in the image, the size of the parameter may be used as a normalization term by adding it to the error function. In the normalization, the absolute value of the parameter, the square value of the parameter, and both thereof (referred to as lasso, ridge, and elasticnet, respectively) can be used.

Furthermore, as described later, in the CNN parameter transmission scheme, the CNN parameter code amount may be further added to the error of the error function.

Another CNN network that evaluates an image goodness may also be used for training. In this case, the output of the CNN filter 107 (Generator) to be evaluated is input in series into a different evaluation CNN network (Discriminator), and the evaluation value of the evaluation CNN network is minimized (or maximized). At the same time as training of the CNN filter 107, it is also appropriate to train the evaluation CNN network. A method of simultaneously training two networks for generation and evaluation is referred to as Generative Adversarial Networks (GAN).

Note that the CNN filter 305 in the image decoding apparatus 31 is trained by the same method as the CNN filter 107 in the image coding apparatus 11. Note that in a configuration in which the same CNN filter is used for both the image coding apparatus 11 and the image decoding apparatus 31, the CNN parameters of the two CNN filters are the same.

The prediction parameter memory 108 stores the prediction parameters generated by the coding parameter determination unit 110 for each picture and CU of the coding target in a prescribed position.

The reference picture memory 109 stores the decoded image generated by the CNN filter 107 in a prescribed position for each picture and CU of the coding target.

The coding parameter determination unit 110 selects one set among multiple sets of coding parameters. A coding parameter is the above-mentioned prediction parameter or a parameter to be a target of coding generated associated with the prediction parameter. The prediction image generation unit 101 generates the prediction image P of the PUs by using each of the sets of these coding parameters.

The coding parameter determination unit 110 calculates cost values indicating a volume of an information quantity and coding errors for each of the multiple sets. For example, a cost value is a sum of a code amount and a value of multiplying a coefficient λ by a square error. The code amount is an information quantity of the coding stream Te obtained by performing entropy coding on a quantization error and a coding parameter. The square error is a sum of pixels for square values of residual values of residual signals calculated in the subtraction unit 102. The coefficient λ is a real number that is larger than a pre-configured zero. The coding parameter determination unit 110 selects a set of coding parameters by which the calculated cost value is minimized. With this configuration, the entropy encoder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter encoder 111 derives a format for coding from parameters input from the coding parameter determination unit 110, and outputs the format to the entropy encoder 104. A derivation of a format for coding is, for example, to derive a difference vector from a motion vector and a prediction vector. The prediction parameter encoder 111 derives parameters necessary to generate a prediction image from parameters input from the coding parameter determination unit 110, and outputs the parameters to the prediction image generation unit 101. For example, parameters necessary to generate a prediction image are a motion vector of a sub-block unit.

The inter prediction parameter encoder 112 derives inter prediction parameters such as a difference vector, based on prediction parameters input from the coding parameter determination unit 110. The inter prediction parameter encoder 112 includes a partly identical configuration to a configuration by which the inter prediction parameter decoding unit 303 (see FIG. 5 and the like) derives inter prediction parameters, as a configuration to derive parameters necessary for generation of a prediction image output to the prediction image generation unit 101.

The intra prediction parameter encoder 113 derives a format for coding (for example, MPM_idx, rem_intra_luma_pred_mode, and the like) from the intra prediction mode IntraPredMode input from the coding parameter determination unit 110.

Second Embodiment

Another embodiment of the disclosure will be described below with reference to FIG. 18. For the sake of convenience of description, descriptions of members having the same functions as the members described in the above embodiment will be omitted. The network configuration of the CNN filter is considered in a variety of formats. A second embodiment illustrated in FIG. 18 illustrates an example of an CNN filter of a network configuration different from the network configuration described in the first embodiment (FIGS. 9 and 10), and has the same effect as the first embodiment.

Figure 18:
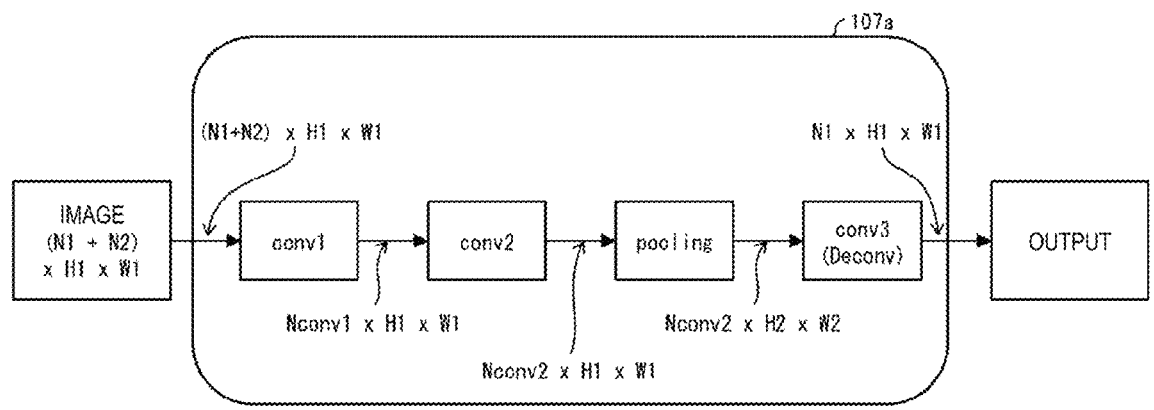
FIG. 18 is a schematic diagram illustrating a configuration of an image filtering apparatus according to a second embodiment.

In the present embodiment, as illustrated in FIG. 18, a CNN filter 107a includes two convX layers (convolutional layers) conv1, conv2, a pooling layer pooling, and a Deconv layer (deconvolutional layer) conv3. The convX layers conv1 and conv2 are convolutional layers, and the Deconv layer conv3 is a deconvolutional layer. The pooling layer pooling is disposed between the convX layer conv2 and the convX layer conv3.

The input unfiltered image has a size of (N1+N2)*H1*W1. In the present embodiment, N1 also represents the number of image channels. W1 represents a width patch size of the picture and H1 represents a height patch size of the picture. N2 represents the number of channels of the coding parameter.

To the first convX layer conv1 of the CNN filter 107a, data of (N1+N2)*H1*W1 is input, and the convX layer conv1 outputs data of Nconv1*H1*W1. To the second convX layer conv2 of the CNN filter 107a, data of Nconv1*H1*W1 is input, and the convX layer conv2 outputs data of Nconv2*H1*W1. To the pooling layer pooling two stages after the convX layer conv2, data of Nconv2*H1*W1 is input, and the pooling layer pooling outputs data of Nconv2*H2*W2. That is, the pooling layer pooling transforms the data having a size of H1*W1 in height*width output from the convX layer conv2 into the data having a size of H2*W2. To the Deconv layer conv3 one stage after the pooling layer pooling, data of Nconv2*H2*W2 is input, and the Deconv layer conv3 outputs data of N1*H1*W1. That is, the Deconv layer conv3 changes the data having a size of H2*W2 in height*width output from the pooling layer pooling back to the data having a size of H1*W1. Here, transposed convolution is used.

Note that in the present embodiment also, the CNN filter in the image decoding apparatus has functions similar to the CNN filter 107a in the image coding apparatus.

In the present embodiment also, as illustrated in (a) of FIG. 34 according to Embodiment 1, the unfiltered image may be configured to be separated into a channel of the luminance (Y) and quantization parameter (QP), a channel of the first chrominance (Cb) and quantization parameter (QP), and a channel of the second chrominance (Cr) and quantization parameter (QP), and input into the CNN filter 107a. As illustrated in (b) of FIG. 34 according to Embodiment 1, the unfiltered image may be configured to be separated into a channel of the luminance (Y) and quantization parameter (QP), and a channel of the first chrominance (Cb), second chrominance (Cr), and quantization parameter (QP), and input into the CNN filter 107a. That is, the CNN filter 107a may be configured to perform the filtering process on an image (input) in which the luminance and the reference parameter are interleaved, and perform the filtering process on an image (input) in which the first chrominance, the second chrominance, and the reference parameter are interleaved. Note that the reference parameter (coding parameter) is not limited to the quantization parameter (QP), and the CNN filter 107a may use one or more coding parameters.

According to the configuration of the second embodiment, by use of a kind of autoencoder type network configuration in which the data reduced by the convolutional layer and the pooling layer enlarged in a trans pooling layer, the filtering process can be performed taking into account an amount of higher conceptual characteristics. That is, in a case of the filtering process according to the coding parameters, the filter intensity can be changed taking into account the amount of higher characteristics in which an edge or a color is integrated.

Third Embodiment

Another embodiment of the disclosure will be described below with reference to FIGS. 19 to 20. For the sake of convenience of description, descriptions of members having the same functions as the members described in the above embodiment will be omitted.

Figure 19:
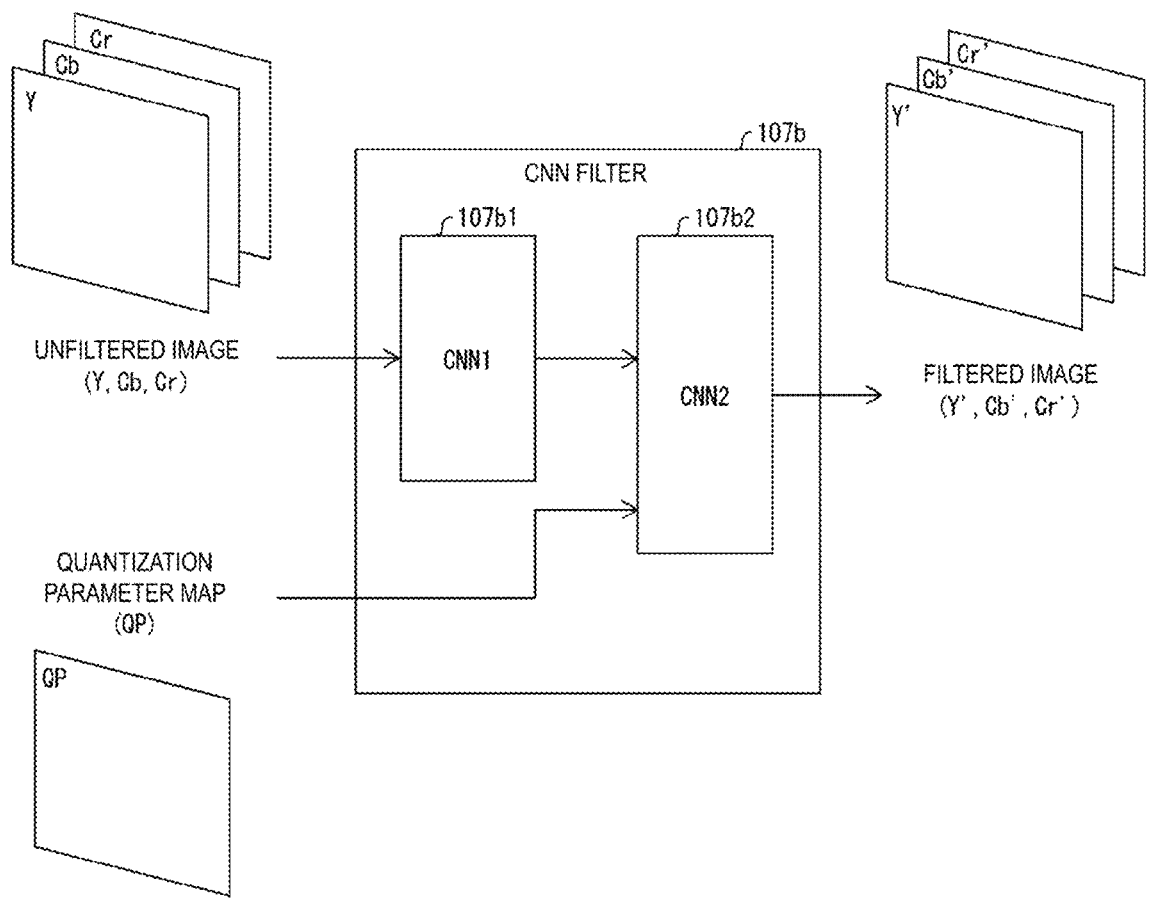
FIG. 19 is a conceptual diagram illustrating an example of an image filtering apparatus according to a third embodiment.

In the present embodiment, as illustrated in FIG. 19, a CNN filter 107b includes a first CNN filter 107b1 and a second CNN filter 107b2. To the first CNN filter 107b1, a unfiltered image is input. The first CNN filter 107b1 extracts features such as directionality and activity. To the second CNN filter 107b2, data processed by the first CNN filter 107b1 and a quantization parameter (QP) as a coding parameter are input.

That is, the first CNN filter 107b1 outputs, as an output image, the first type input image data which is input to the second CNN filter 107b2 that is a second neural network.

The second CNN filter 107b2 performs a filtering process that weighs the extracted features. The second CNN filter 107b2 utilizes the coding parameters to control how to weigh for the filtering process. A filtered image is output from the second CNN filter 107b2.

Unlike the CNN filter 107 described above, input to the first CNN filter 107b1 is the unfiltered image which includes three channels including a channel of a luminance (Y), a channel of a first chrominance (Cb), and a channel of a second chrominance (Cr), and the first CNN filter 107b1 outputs the filtered image which includes three channels including a luminance and two chrominances. Note that the channels of the unfiltered image and the filtered image are not limited to Y, Cb, and Cr, and may be R, G, and B, or alpha or depth may be further added.

Note that in addition to the quantization parameters (QP), other coding parameters such as prediction parameters may be input to the second CNN filter 107b2. Note that, of course, in addition to the quantization parameters (QP), the configuration for inputting other coding parameters such as prediction parameters is not limited to the present embodiment, and the same applies to other embodiments.

In the present embodiment also, as illustrated in (a) of FIG. 34 according to Embodiment 1, the unfiltered image may be configured to be separated into a channel of the luminance (Y), a channel of the first chrominance (Cb), and a channel of the second chrominance (Cr), and input into the CNN filter 107b1. As illustrated in (b) of FIG. 34 according to Embodiment 1, the unfiltered image may be configured to be separated into a channel of the luminance (Y), and a channel of the first chrominance (Cb) and second chrominance (Cr), and input into the CNN filter 107b1. That is, the CNN filter b1 may be configured to perform the filtering process on an image (input) in which the luminance and the reference parameter are interleaved, and perform the filtering process on an image (input) in which the first chrominance, the second chrominance, and the reference parameter are interleaved. Note that the reference parameter (coding parameter) is not limited to the quantization parameter (QP), and the CNN filter b1 may use one or more coding parameters.

Figure 20:
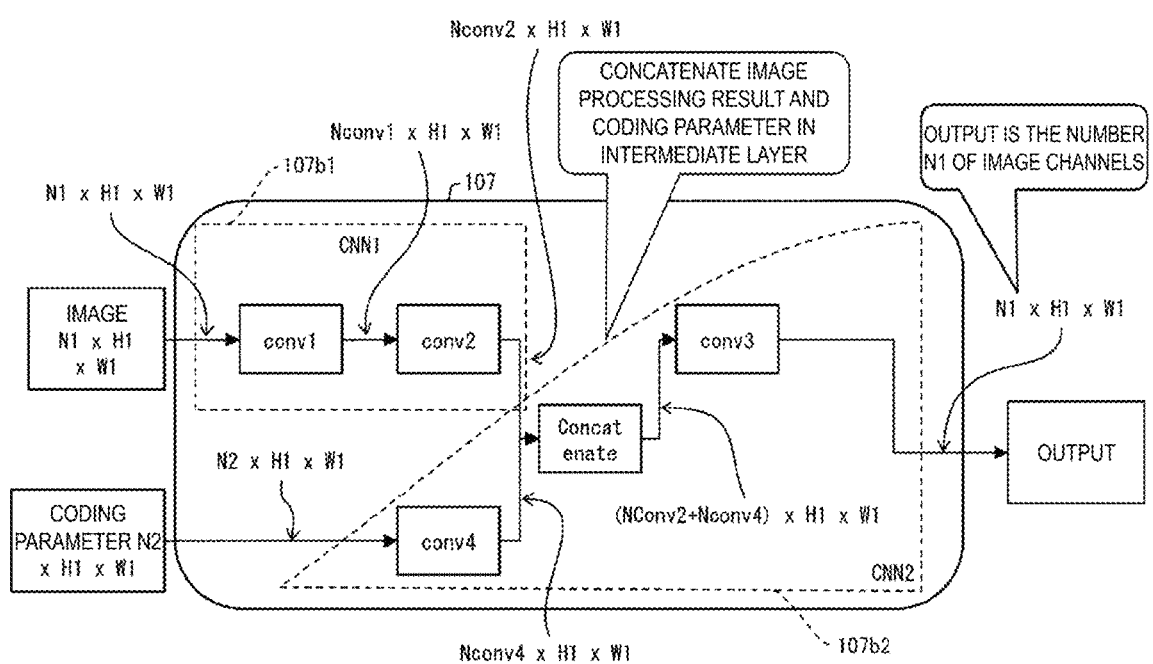
FIG. 20 is a schematic diagram illustrating a configuration of the image filtering apparatus according to the third embodiment.

FIG. 20 is a schematic diagram illustrating a configuration of the CNN filter 107b according to the present embodiment. As illustrated in FIG. 20, the first CNN filter 107b1 includes two convX layers (conv1, conv2). The second CNN filter 107b2 includes two convX layers (conv3, conv4) and a Concatenate layer.

To the layer conv1 of the first CNN filter 107b1, data of N1*H1*W1 is input, and the layer conv1 outputs data of Nconv1*H1*W1. To the layer conv2 of the first CNN filter 107b1, data of Nconv1*H1*W1 is input, and the layer conv2 outputs data of Nconv2*H1*W1 that is the image processing result.

To the layer conv4 of the second CNN filter 107b2, data of N2*H1*W1 is input, and the layer conv4 outputs data of Nconv4*H1*W1. To the Concatenate layer of the second CNN filter 107b2, an image processing result, a coding parameter processed by the layer conv4, and (Nconv2+Nconv4)*H1*W1 are input, the Concatenate layer concatenates the input data to output data of Nconv3*H1*W1. To the layer conv3 of the second CNN filter 107b2, data of Nconv3*H1*W1 is input, and the layer conv3 outputs data of N1*H1*W1.

Figure 21:
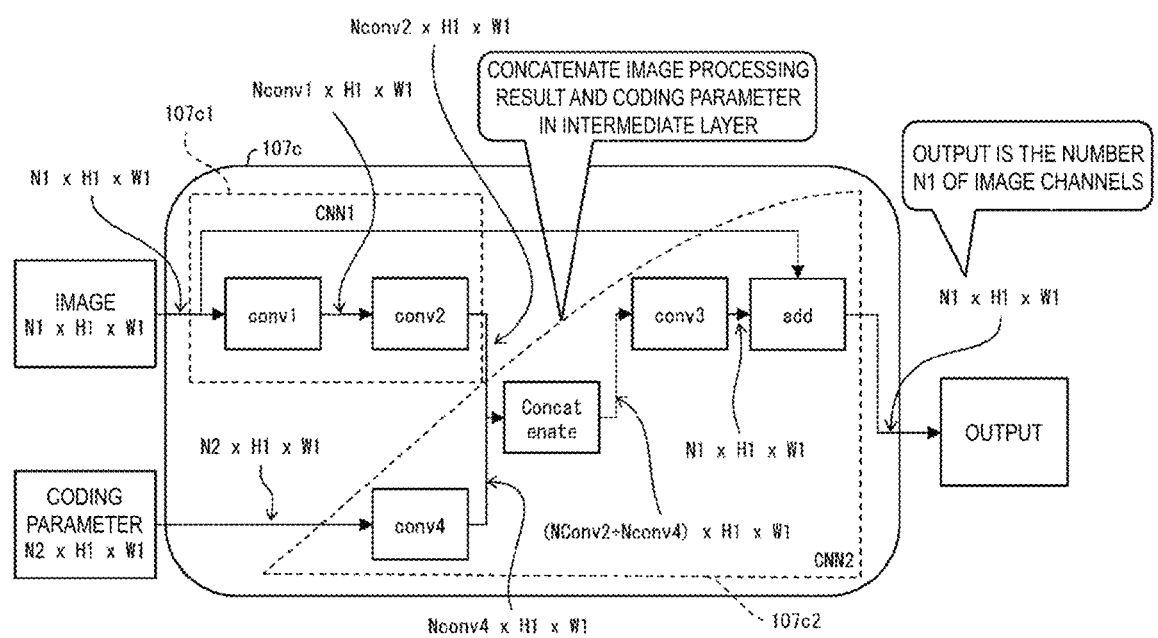
FIG. 21 is a schematic diagram illustrating a modification example of the configuration of the image filtering apparatus according to the third embodiment.

FIG. 21 is a schematic diagram illustrating a modification example of the configuration of the image filtering apparatus according to the present embodiment. As illustrated in FIG. 21, a second CNN filter 107c2 of a CNN filter 107c may not include an add layer. To the add layer, data of N1*H1*W1 output by the layer conv3 of the second CNN filter 107b2 and image data of N1*H1*W1 are input, and the add layer outputs data of N1*H1*W1.

Note that in the present embodiment also, the CNN filter in the image decoding apparatus has functions similar to the CNN filters 107b and 107c in the image coding apparatus.

According to the configuration of the third embodiment, the input of the image data and the input of the coded data are performed by different networks. With such a configuration, the input size of the image data and the input size of the coded data can be different from each other. Additionally, by using a network CNN1 dedicated to image data only, learning can be facilitated, and the overall network configuration can be small. In addition, a network of CNN2 to which the coding parameters are input may perform weighting and further feature extraction, using the coding parameters, on the filtered image and feature extraction which are the data derived by the first CNN filter CNN1, and an advanced filtering process can be performed.

Fourth Embodiment

Another embodiment of the disclosure will be described below with reference to FIG. 22. For the sake of convenience of description, descriptions of members having the same functions as the members described in the above embodiment will be omitted.

Figure 22:
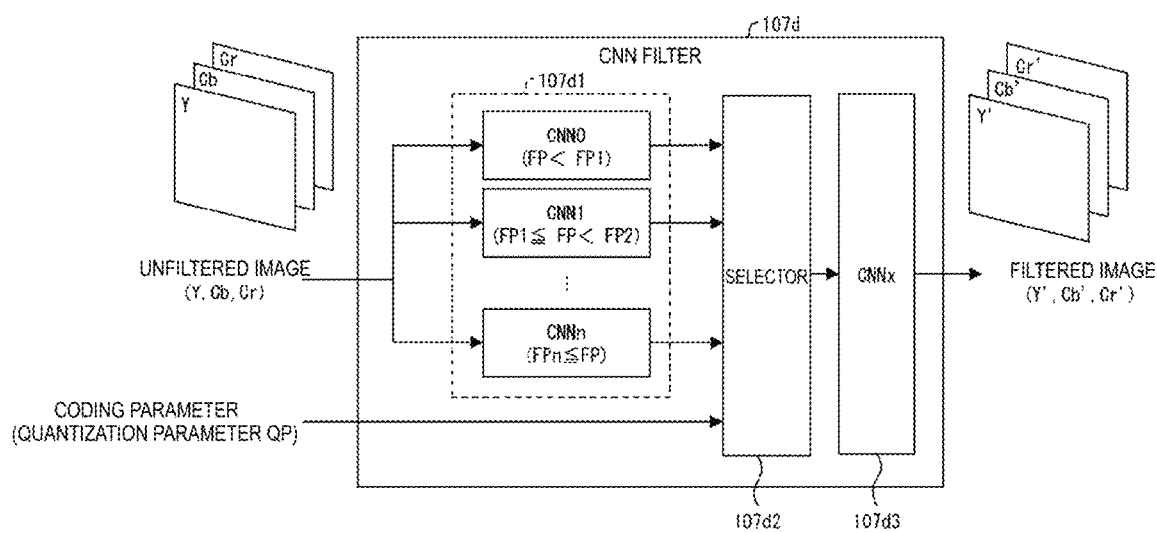
FIG. 22 is a conceptual diagram illustrating an example of an image filtering apparatus according to a fourth embodiment.

In the present embodiment, as illustrated in FIG. 22, a CNN filter 107d includes a CNN filter 107d1, at the first stage, which serves as multiple dedicated neural networks, including n+1 CNN filters CNN0, CNN1, . . . , and CNNn, a selector 107d2, and a CNN filter 107d3, at the second stage, which serves as a common neural network.

In the CNN filter 107d1 at the first stage, the CNN filter CNN0 is a filter which is configured similar to the CNN filter 107b1 described above, but is optimized for a filter parameter FP having a smaller value than FP1. The CNN filter CNN1 is a filter which is optimized for a filter parameter FP having a value equal to or greater than FP1 and smaller than FP2. The CNN filter CNNn is a filter which is optimized for a filter parameter FP having a value equal to or greater than FPn.

Each of the CNN filters CNN0, CNN1, . . . , and CNNn included in the CNN filter 107*d*1 at the first stage outputs a filtered image to the selector 107*d*2. To the selector 107*d*2, the filter parameter FP is input, and the selector 107*d*2 selects, depending on the input filter parameter FP, the filtered image to be output to the CNN filter 107*d*3 at the second stage. Thus, to the CNN filter 107*d*3 at the second stage, an image is input that has been filtered by a filter optimum for the filter parameter FP input to the selector 107*d*2. In other words, the dedicated neural network in the present embodiment selectively acts on the input image data depending on the value of the filter parameters in the image data input to the image filtering apparatus.

Note that the filter parameter FP for selecting the CNN filter may be explicitly coded in the coded data or may be derived from the coding parameters. For example, the filter parameter FP may be derived from a representative value (such as an average value) of a quantization parameter that is one of the coding parameters.

The CNN filter 107*d*3 at the second stage filters the input image and outputs a filtered image. In other words, the common neural network in the present embodiment acts, in common, on the image data output from the dedicated neural networks, regardless of the value of the filter parameter.

Note that the filter parameter FP to be used for the selection by the selector 107*d*2 is not limited to the representative value of the quantization parameter (QP) in the input image. The filter parameter FP may also be explicitly transmitted in the coded data. Furthermore, examples of the filter parameter FP include, in addition to the quantization parameters in the input image, parameters indicating the type of intra prediction and inter prediction in the input image, a parameter indicating an intra prediction direction in the input image (intra prediction mode), parameters indicating a partition split depth (depth information, split information) in the input image, and a parameter indicating a size of a partition in the input image. Note that, in these parameters, a representative value may be used such as a value of a specific position (upper left or center), an average value, a minimum value, a maximum value, a median value, and a mode value.

Figure 23:
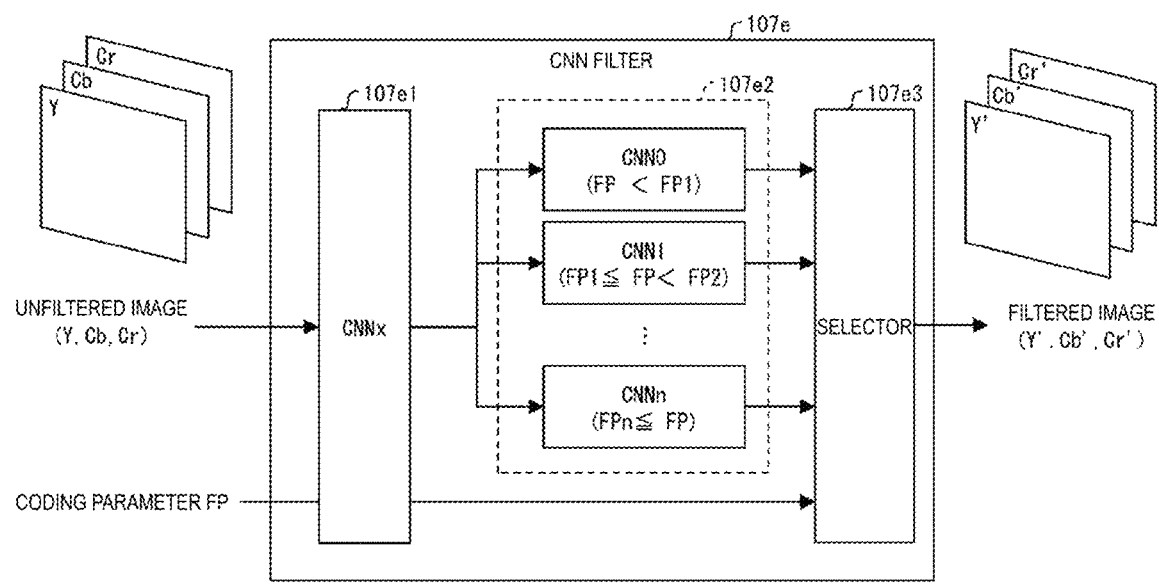
FIG. 23 is a conceptual diagram illustrating a modification example of the example of the image filtering apparatus according to the fourth embodiment.

FIG. 23 is a schematic diagram illustrating a modification example of the configuration of the image filtering apparatus according to the present embodiment. As illustrated in FIG. 23, in a CNN filter 107*e*, a CNN filter 107*e*2 which serves as multiple dedicated neural networks, including n+1 CNN filters CNN0, CNN1, . . . , and CNNn and a selector 107*e*3 may be arranged at stages after a CNN filter 107*e*1 that forms a common neural network. In this case, the CNN filter 107*e*1 acts on an image data input to the CNN filter 107*e*, and the CNN filter 107*e*2 selectively acts on an image data output from the CNN filter 107*e*1 depending on the value of the filter parameters in the input image data. The selector 107*e*3 outputs a filtered image.

Note that in the present embodiment also, the CNN filter in the image decoding apparatus has functions similar to the CNN filter in the image coding apparatus.

According to the configuration of the fourth embodiment, by use of a section (107*e*2) switching a network according to a size of the filter parameter FP and a section (107*e*1) using the same network regardless of the largeness of the filter parameter, the network configuration can be reduced compared to a configuration in which the all filters are switched using the coding parameters such as the quantization parameters. The smaller the network configuration, the smaller the amount of computation and the higher the speed, as well as, there is an effect that the learning parameters can be more robust and the appropriate filtering process can be performed on a larger number of input images.

Note that in the present embodiment also, as illustrated in (a) of FIG. 34 according to Embodiment 1, the unfiltered image may be configured to be separated into a channel of the luminance (Y), a channel of the first chrominance (Cb), and a channel of the second chrominance (Cr), and input into the CNN filter 107*d*1. As illustrated in (b) of FIG. 34 according to Embodiment 1, the unfiltered image may be configured to be separated into a channel of the luminance (Y), and a channel of the first chrominance (Cb) and second chrominance (Cr), and input into the CNN filter 107*d*1. That is, the CNN filter dl may perform the filtering process on an image (input) in which the luminance and the reference parameter are interleaved, and perform the filtering process on an image (input) in which the first chrominance, the second chrominance, and the reference parameter are interleaved. Note that the reference parameter (coding parameter) is not limited to the quantization parameter (QP), and the CNN filter dl may use one or more coding parameters.

Fifth Embodiment

Another embodiment of the disclosure will be described below with reference to FIG. 24. For the sake of convenience of description, descriptions of members having the same functions as the members described in the above embodiment will be omitted.

Figure 24:
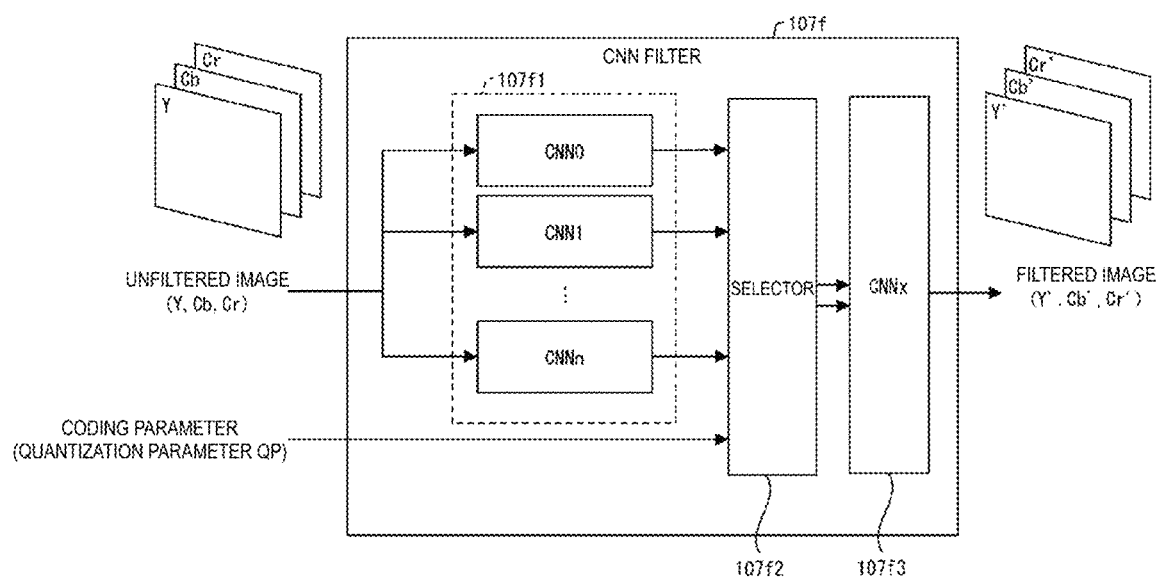
FIG. 24 is a conceptual diagram illustrating an example of an image filtering apparatus according to a fifth embodiment.

In the present embodiment, as illustrated in FIG. 24, a CNN filter 107*f* includes a CNN filter 107*f*1, at the first stage, including n+1 CNN filters CNN0, CNN1, . . . , and CNNn, a selector 107*f*2, and a CNN filter 107*f*3, at the second stage.

In the CNN filter 107*f*1 at the first stage, the CNN filter CNN1 is a filter which is optimized for a quantization parameter (QP) having a value greater than QP1L and smaller than QP1H. The CNN filter CNN2 is a filter which is optimized for a quantization parameter (QP) having a value greater than QP2L and smaller than QP2H. The CNN filter CNN3 is a filter which is optimized for a quantization parameter (QP) having a value greater than QP3L and smaller than QP3H. The CNN filter CNN4 is a filter which is optimized for a quantization parameter (QP) having a value greater than QP4L and smaller than QP4H. Other CNN filters are similar filters.

As specific examples of the thresholds QP1L, QP1H, . . . QP4L, and QP4H, values of QP1L=0, QP1H=18, QP2L=12, QP2H=30, QP3L=24, QP3H=42, QP4L=36, and QP4H=51 may be assigned.

In this case, for example, in a case that the quantization parameter (QP) is equal to 10, the selector 107*f*2 selects the CNN filter CNN1. In a case that the quantization parameter (QP) is equal to 15, the selector 107*f*2 selects the CNN filter CNN1 and the CNN filter CNN2. In a case that the quantization parameter (QP) is equal to 20, the selector 107*f*2 selects the CNN filter CNN2. In a case that the quantization parameter (QP) is equal to 25, the selector 107*f*2 selects the CNN filter CNN2 and the CNN filter CNN3. In a case that the quantization parameter (QP) is equal to 30, the selector 107*f*2 selects the CNN filter CNN3.

The CNN filter 107*f*3 at the second stage outputs the input image as a filtered image in a case that the selector 107*f*2 selects one kind of the CNN filter, and the CNN filter 107*f*3 outputs an average value of the two input images as a filtered image in a case that the selector 107*f*2 selects two kinds of the CNN filters.

Note that in the present embodiment also, the CNN filter in the image decoding apparatus has functions similar to the CNN filter 107*f* in the image coding apparatus.

According to the configuration of the fifth embodiment, by use of a section (107*f*1) switching a network according to a largeness of the quantization parameter QP and a section (107*f*2) using the same network regardless of the largeness of the quantization parameter QP, the network configuration can be reduced compared to a configuration in which the all filters are switched using the coding parameters such as the quantization parameters. The smaller the network configuration, the smaller the amount of computation and the higher the speed, as well as, there is an effect that the learning parameters can be more robust and the appropriate filtering process can be performed on a larger number of input images. In addition, overlapping the range of optimization of each CNN filter may avoid visual distortion at the border of the patch at the time when the filter is switched.

Sixth Embodiment

Another embodiment of the disclosure will be described below with reference to FIG. 25. For the sake of convenience of description, descriptions of members having the same functions as the members described in the above embodiment will be omitted.

As described above, the image filtering apparatus may utilize a function to reduce block distortion and a filter that reduces ringing distortion. The image filtering apparatus may perform the process using the CNN filter in combination with the process using another filter such as a Deblocking Filter (DF) that reduces block distortion, and a Sample Adaptive Offset (SAO) that reduces ringing distortion.

In the present embodiment, a configuration is described in which the CNN filter is used in combination with the process of the deblocking filter (DF) or the process of the sample adaptive offset (SAO) will be described.

Figure 25:
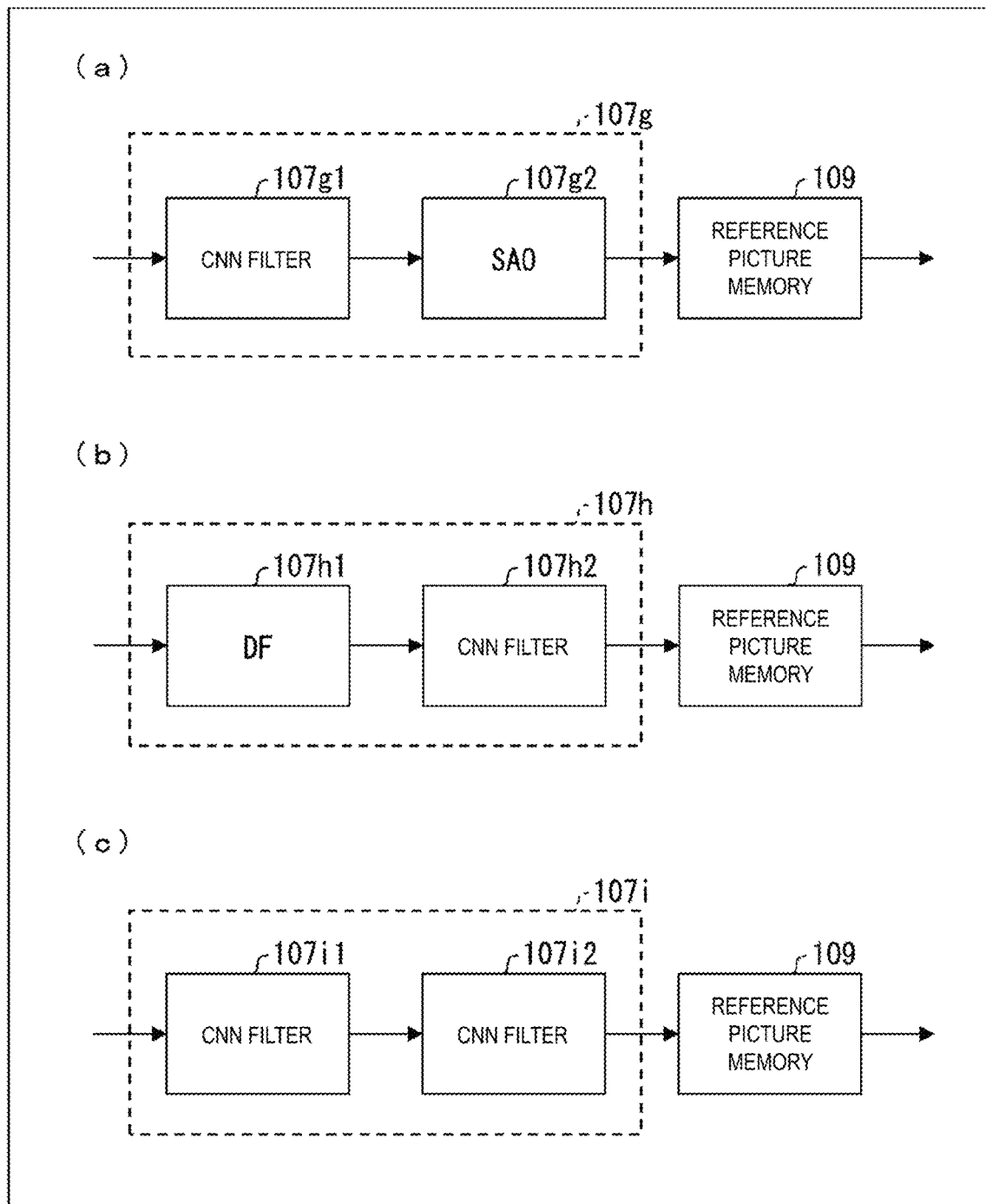
FIG. 25 is a conceptual diagram illustrating a modification example of an image filtering apparatus according to a sixth embodiment.

First Example (a) of FIG. 25 illustrates a first example of the present embodiment. In the first example, an image filtering apparatus 107*g* includes a CNN filter 107*g*1 and a sample adaptive offset (SAO) 107*g*2. The CNN filter 107*g*1 functions as a filter to reduce block distortion.

Second Example (b) of FIG. 25 illustrates a second example of the present embodiment. In the second example, an image filtering apparatus 107*h* includes a deblocking filter (DF) 107*h*1 and a CNN filter 107*g*2. The CNN filter 107*h*2 functions as a filter to further reduce a ringing noise at a stage after the deblocking filter.

Third Example (c) of FIG. 25 illustrates a third example of the present embodiment. In the third example, an image filtering apparatus 107*i* includes a first CNN filter 107*i*1 and a second CNN filter 107*i*2. The first CNN filter 107*i*1 functions as a filter to reduce block distortion, and the second CNN filter 107*i*2 functions as a filter to further reduce a ringing noise at a stage after the filter reducing the block distortion.

Note that in any example also, the CNN filter in the image decoding apparatus has functions similar to the CNN filter in the image coding apparatus.

The unfiltered image that is input to each of the image filtering apparatuses 107*g* to 107*i* according to the present embodiment, similarly to other embodiments, may be an image which includes three image channels including a channel of a luminance (Y), a channel of a first chrominance (Cb), and a channel of a second chrominance (Cr), and one coding parameter (reference parameter) channel including a channel of a quantization parameter (QP). As illustrated in (a) of FIG. 34, the unfiltered image may be configured to be separated into a channel of the luminance (Y) and quantization parameter (QP), a channel of the first chrominance (Cb) and quantization parameter (QP), and a channel of the second chrominance (Cr) and quantization parameter (QP), and input into the image filtering apparatuses 107*g* to 107*i*. As illustrated in (b) of FIG. 34, the unfiltered image may be configured to be separated into a channel of the luminance (Y) and quantization parameter (QP), and a channel of the first chrominance (Cb), second chrominance (Cr), and quantization parameter (QP), and input into the image filtering apparatuses 107*g* to 107*i*. That is, the image filtering apparatuses 107*g* to 107*i* may perform the filtering process on an image (input) in which the luminance and the reference parameter are interleaved, and perform the filtering process on an image (input) in which the first chrominance, the second chrominance, and the reference parameter are interleaved. Note that the reference parameter (coding parameter) is not limited to the quantization parameter (QP), and the image filtering apparatuses 107*g* to 107*i* may use one or more coding parameters.

Seventh Embodiment

Another embodiment of the disclosure will be described below with reference to FIGS. 26 to 30. For the sake of convenience of description, descriptions of members having the same functions as the members described in the above embodiment will be omitted.

Figure 26:
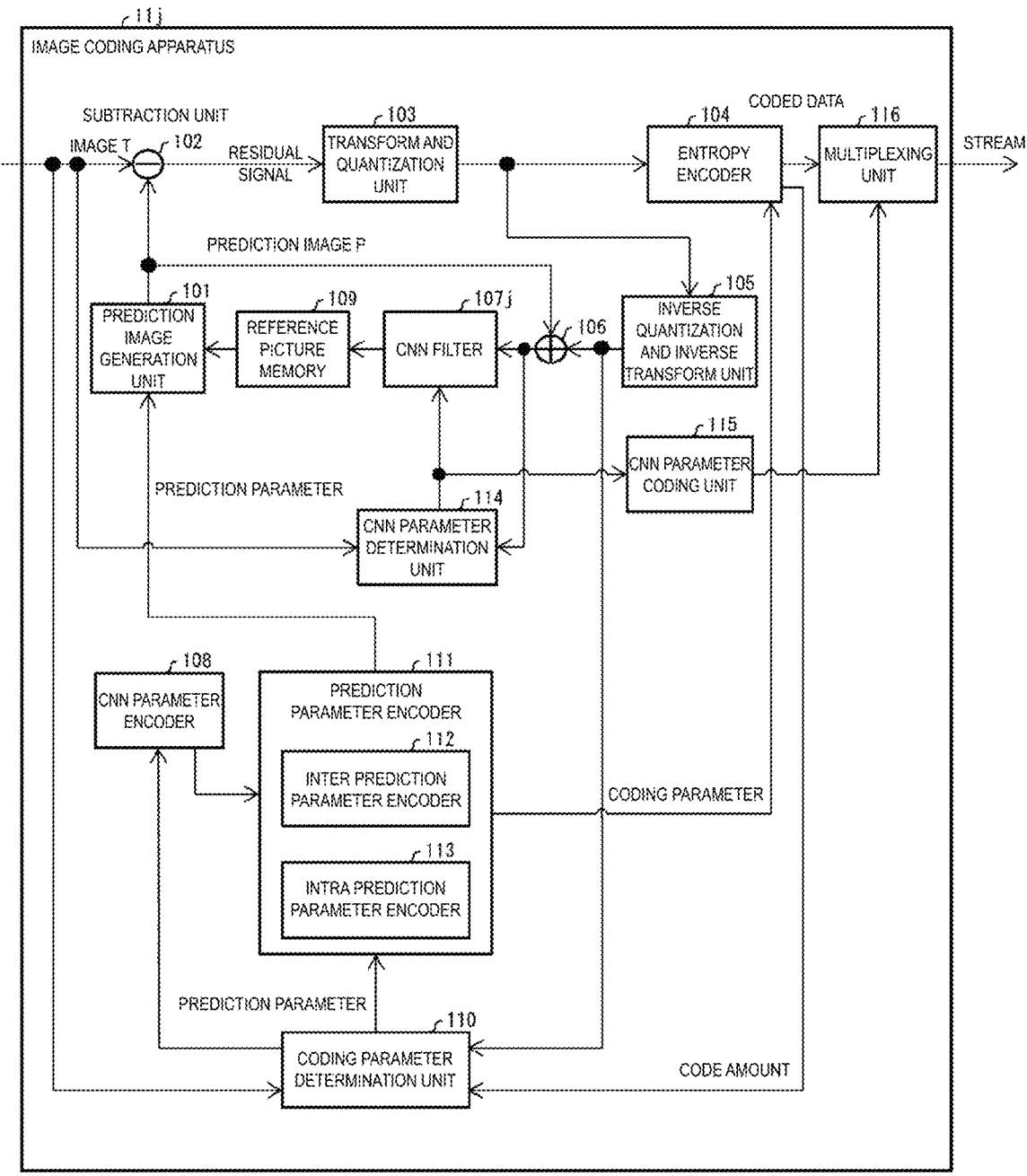
FIG. 26 is a block diagram illustrating a configuration of an image coding apparatus according to a seventh embodiment.

FIG. 26 is a block diagram illustrating the configuration of the image coding apparatus according to the present embodiment. An image coding apparatus 11*j* according to the present embodiment differs from the above-described embodiment in that the CNN filter 107*j* acquires CNN parameters and perform filtering process using the acquired CNN parameters. The CNN parameters used by the CNN filter 107*j* differ from the above-described embodiment in that the CNN parameters are dynamically updated in units of a sequence, in units of a picture, and the like. In the above-described embodiment, the CNN parameter has a predetermined fixed value and is not updated.

As illustrated in FIG. 26, the image coding apparatus 11*j* according to the present embodiment includes a CNN parameter determination unit 114, a CNN parameter encoder 115, and a multiplexing unit 116 in addition to the configuration provided to the image coding apparatus 11 illustrated in FIG. 4.

The CNN parameter determination unit 114 acquires an image T (input image) and an output (unfiltered image) from the addition unit 106, and updates the CNN parameter, that is the neural network parameter, so that the difference between the input image and the unfiltered image is small.

Figure 27:
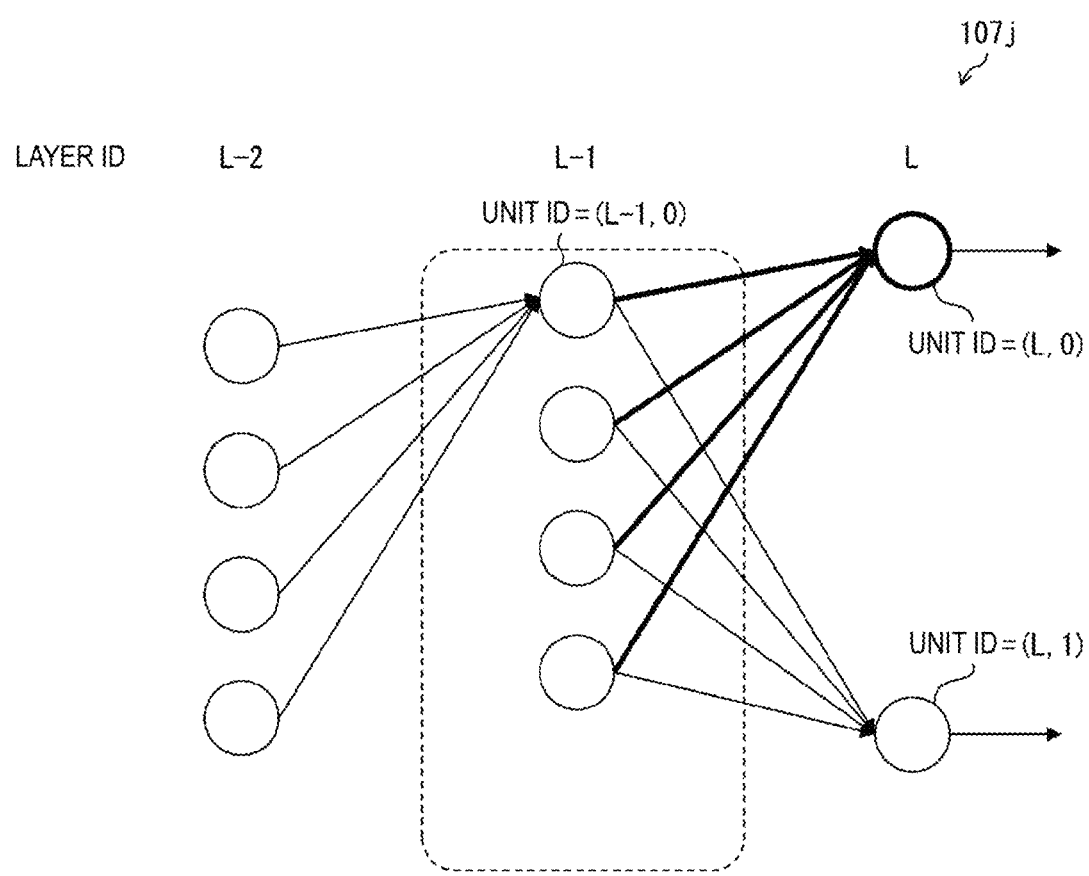
FIG. 27 is a schematic diagram illustrating a configuration of the image filtering apparatus according to the present embodiment.

FIG. 27 is a schematic diagram illustrating an example of a configuration of the CNN filter 107*j*. As described above, the CNN filter includes multiple layers such as the convX layers, and the CNN filter 107j illustrated in FIG. 27 includes three layers. Each layer can be identified by a layer ID. In the CNN filter 107j illustrated in FIG. 27, a layer ID of the input side layer is L-2, a layer ID of the middle layer is L-1, and a layer ID of the output side layer is L.

Each layer also includes multiple units, and each unit can be identified by a unit ID. A unit ID of the top unit in the middle L-1 is (L-1, 0), a unit ID of the upper unit in the output side layer L is (L, 0), and a unit ID of the lower unit in the output side layer L is (L, 1). As illustrated in FIG. 27, each of the units in each layer is connected to a unit in the next layer. In FIG. 27, connections between the units are indicated by arrows. The weights to the respective connections are different and are controlled by weight coefficients.

The CNN parameter determination unit 114 outputs filter coefficients that includes both weight coefficients and a bias (offset). The CNN parameter determination unit 114 outputs an identifier as the CNN parameter. In a case that the CNN filter includes multiple CNN layers, the identifier is a CNN ID that identifies each CNN layer. In a case that the CNN layer is identified by the layer ID and the unit ID, the identifier is the layer ID and the unit ID.

The CNN parameter determination unit 114 outputs data indicating a unit structure as the CNN parameter. The data indicating the unit structure can be, for example, a filter size such as 3*3. The data indicating the filter size is output as a CNN parameter in a case that the filter size is variable. In a case that the filter size is fixed, the output of the data indicating the filter size is not required.

The CNN parameter determination unit 114 performs entire update for updating all of the parameters, or partial update for updating of the parameters of the units of some layers. The CNN parameter determination unit 114 adds, to the CNN parameter, data indicating whether or not the updated content is output as a difference, and outputs the resultant CNN parameter.

The CNN parameter determination unit 114 can output the CNN parameter value such as, for example, a filter coefficient, without change. The CNN parameter determining unit 114 can output a difference parameter value, for example, a difference from the CNN parameter value before updating, and a difference from a default value, and the like. The CNN parameter determination unit 114 can compress the CNN parameter value in a prescribed scheme and output the compressed CNN parameter value.

Figure 28:
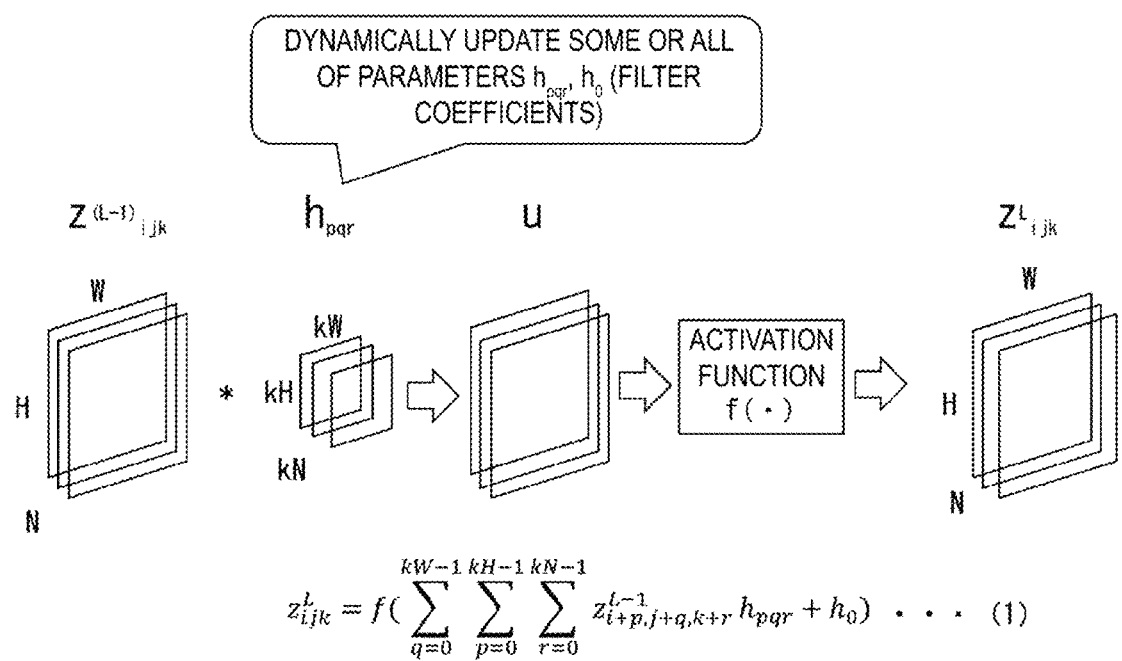
FIG. 28 is a conceptual diagram illustrating an example of parameter update in the image filtering apparatus according to the present embodiment.

Referring to FIG. 28, a layer, a unit configuration, and update of the CNN parameters (filter coefficients, weight coefficients) are described.

In each layer, the product sum of an input value $Z^{(L-1)}_{ijk}$ of the layer, and L layer parameters (filter coefficients) $h_{pqr}$ and $h_0$ are passed to an activation function (Equation (1) illustrated in FIG. 28), and a value $Z^L_{ijk}$ to which the activation function (1) is applied is output to the next layer. Here, N represents the number of channels of the input of the layer, W represents the width of the input of the layer, and H represents the height of the input of the layer. Moreover, kN represents the number of input channels of the kernel (filter) and is basically equal to N. kW represents the width of the kernel, and kH represents the kernel height.

In the present embodiment, the CNN parameter determination unit 114 can dynamically update at least a part of the CNN parameters (filter coefficients) $h_{pqr}$ and $h_0$.

Figure 29:
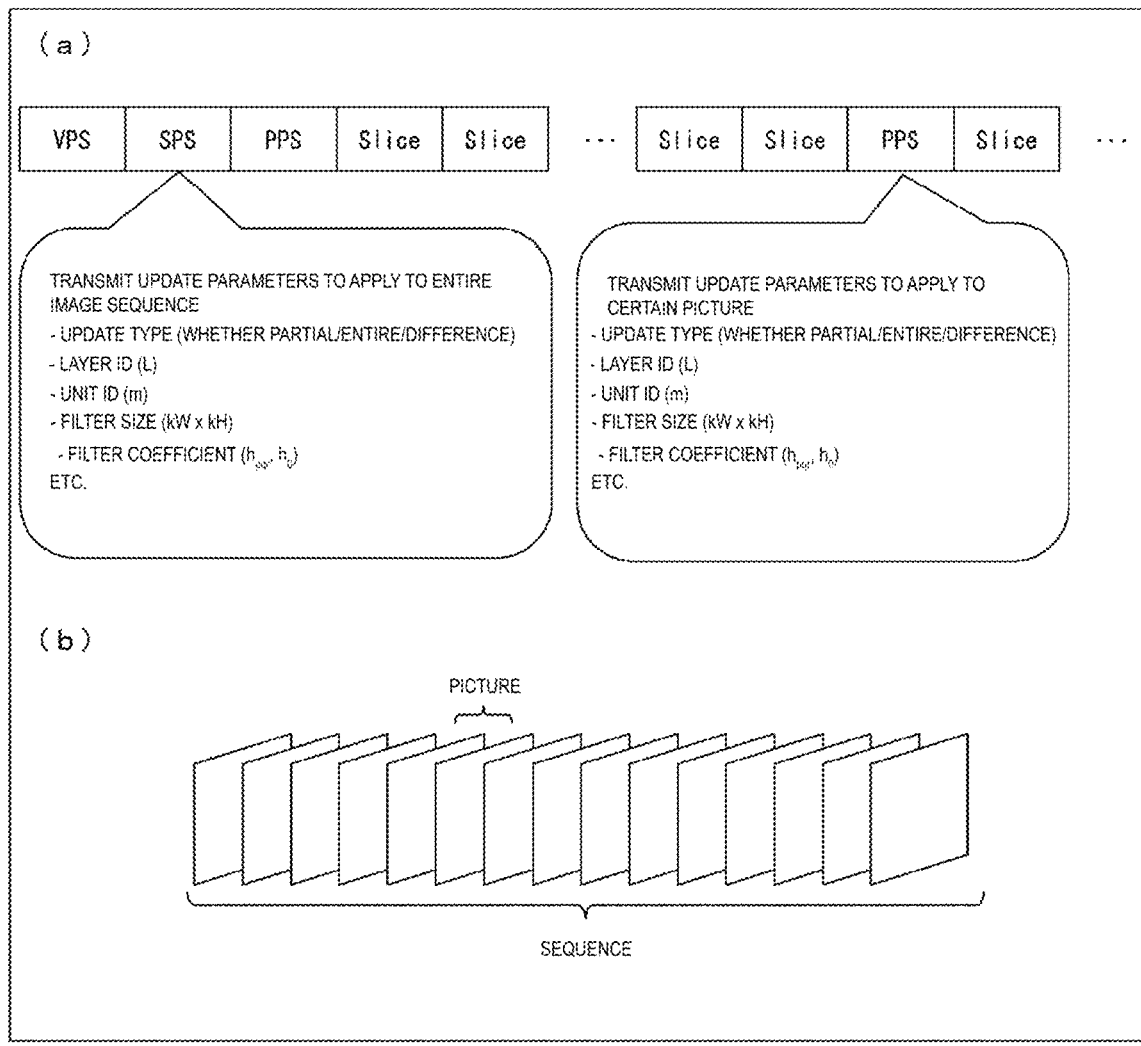
FIG. 29 is a diagram illustrating a data structure for transmitting a parameter.

In this embodiment, the CNN parameters are transmitted by data of network abstract layer (NAL) structure. (a) of FIG. 29 illustrates a coded video sequence that defines a sequence SEQ of data of NAL structure in the present embodiment. In the present embodiment, a Sequence Parameter Set SPS included in the sequence SEQ transmits update parameters applied to entire image sequence such as an update type (indicating whether partial/entire/difference), a layer ID (L) of the CNN, a CNN unit ID (m), an L layer, a filter size of unit IDm (kW*kH), filter coefficients ($h_{pqr}$, $h_0$). A Picture Parameter Set PPS included in the sequence SEQ transmits update parameters applied to a certain picture such as an update type (indicating whether partial/entire/difference), a layer ID (L), a unit ID (m), a filter size (kW*kH), filter coefficients ($h_{pqr}$, $h_0$).

As illustrated in (b) of FIG. 29, the sequence includes multiple pictures. The CNN parameter determination unit 114 can output the CNN parameters in units of a sequence. In this case, the CNN parameters for the entire sequence can be updated. The CNN parameter determination unit 114 can output in units of a picture. In this case, the CNN parameter for a certain period of time can be updated.

Note that the matters described with reference to FIGS. 27 to 29 are common items to the coding side and the decoding side, and the same applies to a CNN filter 305j described later. The matters described with reference to FIGS. 27 to 29 are also applied to CNN parameters that are output to the CNN filter 107j of the image coding apparatus 11j and are also applied to the CNN parameters output to the CNN filter 305j of the image decoding apparatus 31j.

The unfiltered image that is input to the CNN filter 107j according to the present embodiment, similarly to other embodiments, may be an image which includes three image channels including a channel of a luminance (Y), a channel of a first chrominance (Cb), and a channel of a second chrominance (Cr), and one coding parameter channel including a channel of a quantization parameter (QP). As illustrated in (a) of FIG. 34, the unfiltered image may be configured to be separated into a channel of the luminance (Y) and quantization parameter (QP), a channel of the first chrominance (Cb) and quantization parameter (QP), and a channel of the second chrominance (Cr) and quantization parameter (QP), and input into the CNN filter 107j. As illustrated in (b) of FIG. 34, the unfiltered image may be configured to be separated into a channel of the luminance (Y) and quantization parameter (QP), and a channel of the first chrominance (Cb), second chrominance (Cr), and quantization parameter (QP), and input into the CNN filter 107j. That is, the CNN filter 107j may perform the filtering process on an image (input) in which the luminance and the reference parameter are interleaved, and perform the filtering process on an image (input) in which the first chrominance, the second chrominance, and the reference parameter are interleaved. Note that the reference parameter (coding parameter) is not limited to the quantization parameter (QP), and the CNN filter 107j may use one or more coding parameters.

The CNN parameter encoder 115 acquires the CNN parameters output by the CNN parameter determining unit 114, codes the CNN parameters, and outputs the coded CNN parameters to the multiplexing unit 116.

The multiplexing unit 116 multiplexes the coded data output by the entropy encoder 104 and the CNN parameters coded by the CNN parameter encoder 115 to generate a stream and outputs the stream to the outside.

Figure 30:
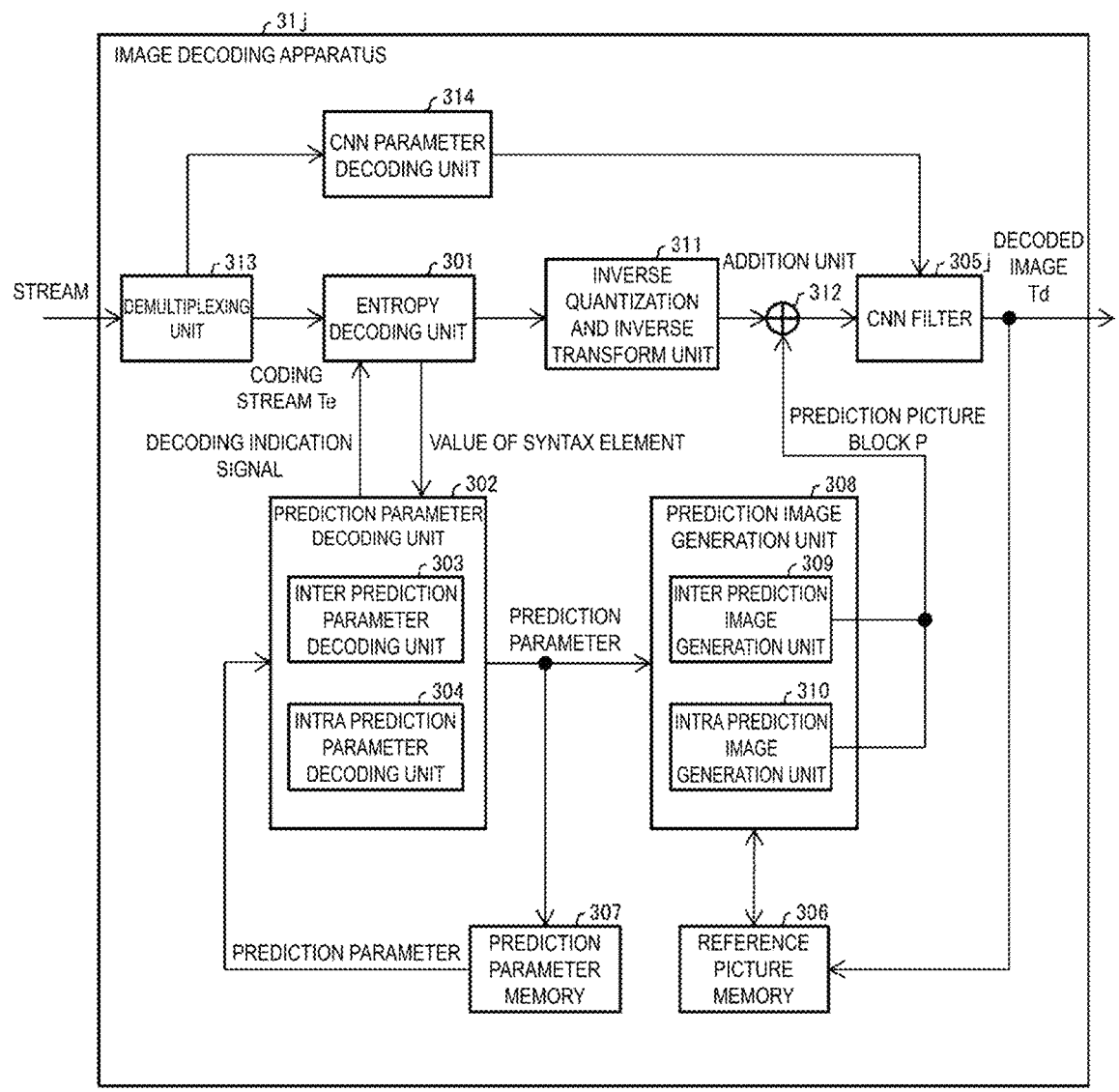
FIG. 30 is a block diagram illustrating a configuration of an image decoding apparatus according to the seventh embodiment.

FIG. 30 is a block diagram illustrating a configuration of an image decoding apparatus according to the present embodiment. In the image decoding apparatus 31j according to the present embodiment, the CNN filter 305j acquires CNN parameters and perform the filtering process using the acquired CNN parameters. The CNN parameters used by the CNN filter 305*j* are dynamically updated in units of a sequence, in units of a picture, and the like.

As illustrated in FIG. 30, the image decoding apparatus 31*j* according to the present embodiment includes a demultiplexing unit 313 and a CNN parameter decoding unit 314, in addition to the configuration provided to the image decoding apparatus 31 illustrated in FIG. 5.

To the demultiplexing unit 313, a stream is input, and the demultiplexing unit 313 demultiplexes the stream into the coded data and the coded CNN parameters.

The CNN parameter decoding unit 314 decodes the coded CNN parameters and outputs the decoded CNN parameters to the CNN filter 305*j*.

A part of the image coding apparatus 11 and image decoding apparatus 31 in the embodiments described above, for example, the entropy decoding unit 301, the prediction parameter decoding unit 302, the CNN filter 305, the prediction image generation unit 308, the inverse quantization and inverse transform unit 311, the addition unit 312, the prediction image generation unit 101, the subtraction unit 102, the transform and quantization unit 103, the entropy encoder 104, the inverse quantization and inverse transform unit 105, the CNN filter 107, the coding parameter determination unit 110, and the prediction parameter encoder 111 may be implemented by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image coding apparatus 11 or the image decoding apparatus 31, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that fall within the scope that does not depart from the gist of the disclosure.

Application Examples

The above-mentioned image coding apparatus 11 and the image decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

Figure 31:
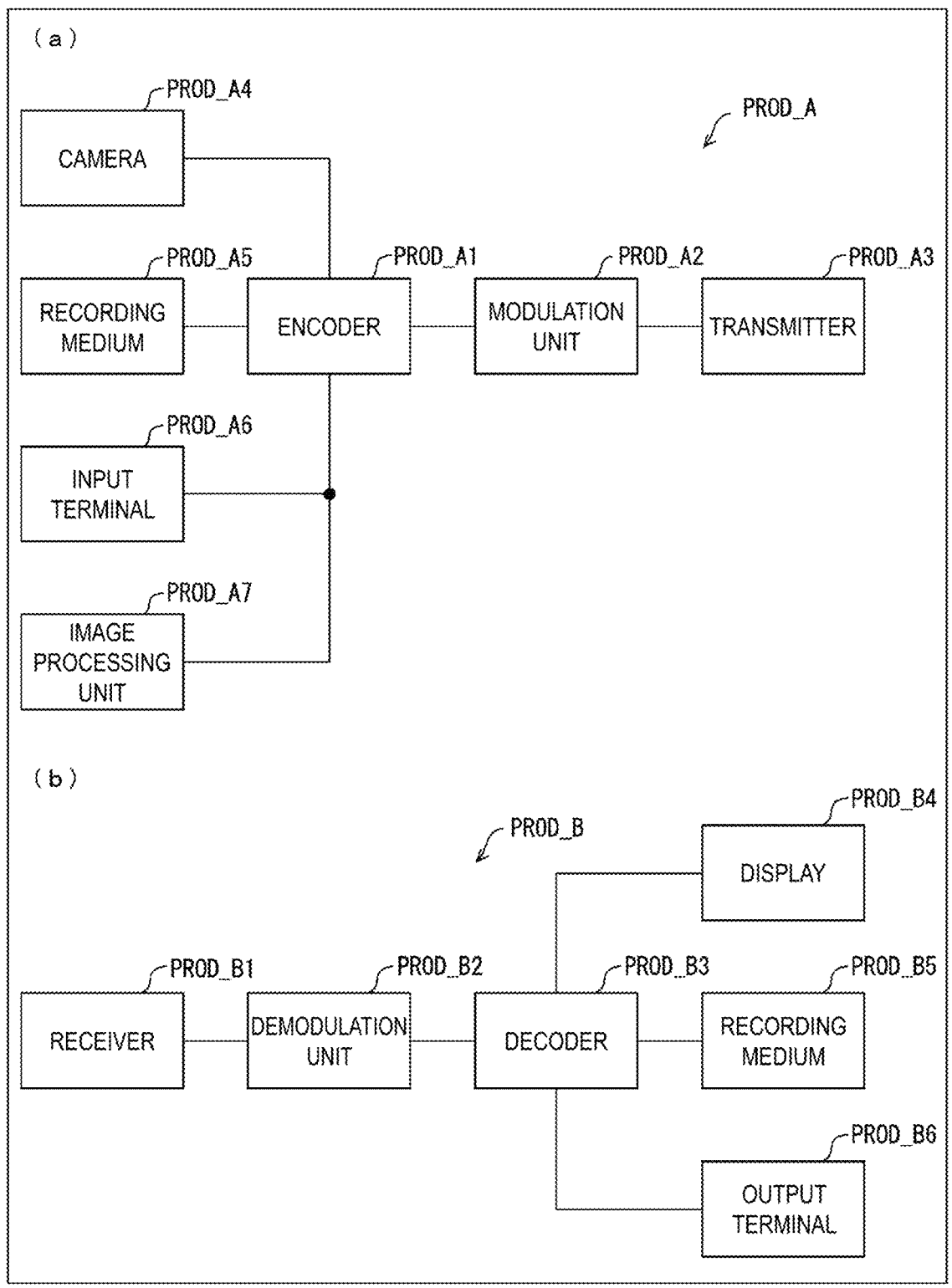
FIG. 31 is a diagram illustrating configurations of a transmission device equipped with the image coding apparatus and a reception device equipped with the image decoding apparatus according to present embodiment. (a) illustrates the transmission device equipped with the image coding apparatus, and (b) illustrates the receiving device equipped with the image decoding apparatus.

First, a description is given of that the image coding apparatus 11 and the image decoding apparatus 31 described above can be used to receive and transmit the video with reference to FIG. 31.

(a) of FIG. 31 is a block diagram illustrating a configuration of a transmission device PROD_A equipped with the image coding apparatus 11. As illustrated in (a) of FIG. 31, the transmission device PROD_A includes an encoder PROD_A1 that codes a video to acquire coded data, a modulation unit PROD_A2 that modulates a carrier wave by using the coded data acquired by the encoder PROD_A1 to acquire a modulated signal, and a transmitter PROD_A3 that transmits the modulated signal acquired by the modulation unit PROD_A2. The above-mentioned image coding apparatus 11 is utilized as the encoder PROD_A1.

The transmission device PROD_A may further include, as resources for supplying a video input to the encoder PROD_A1, a camera PROD_A4 that images a video, a recording medium PROD_A5 that records a video therein, an input terminal PROD_A6 that inputs a video from outside, and an image processing unit A7 that generates or processes an image. In (a) of FIG. 31, although the configuration that the transmission device PROD_A includes these all is exemplified, a part may be omitted.

Note that the recording medium PROD_A5 may record videos which are not coded, or may record videos coded in a coding scheme for recording different than a coding scheme for transmission. In the latter case, a decoding unit (not illustrated) to decode coded data read from the recording medium PROD_A5 according to coding scheme for recording may be interleaved between the recording medium PROD_A5 and the encoder PROD_A1.

(b) of FIG. 31 is a block diagram illustrating a configuration of a reception device PROD_B equipped with the image decoding apparatus 31. As illustrated in (b) of FIG. 31, the reception device PROD_B includes a receiver PROD_B1 that receives a modulated signal, a demodulation unit PROD_B2 that demodulates the modulated signal received by the receiver PROD_B1 to acquire coded data, and a decoder PROD_B3 that decodes the coded data acquired by the demodulation unit PROD_B2 to acquire a video. The above-mentioned image decoding apparatus 31 is utilized as the decoder PROD_B3.

The reception device PROD_B may further include, as supply destinations of the video output by the decoder PROD_B3, a display PROD_B4 that displays the video, a recording medium PROD_B5 that records the video, and an output terminal PROD_B6 that outputs the video to outside. (b) of FIG. 31 illustrates the configuration in which the reception device PROD_B includes all of the above components, but some of these may be omitted.

Note that the recording medium PROD_B5 may record videos which are not coded, or may record videos which are coded in a coding scheme for recording different from a coding scheme for transmission. In the latter case, an encoder (not illustrated) to code videos acquired from the decoder PROD_B3 according to a coding scheme for recording may be interleaved between the decoder PROD_B3 and the recording medium PROD_B5.

Note that the transmission medium transmitting modulated signals may be wireless or may be wired. The transmission aspect to transmit modulated signals may be broadcasting (here, referred to as the transmission aspect where the transmission target is not specified beforehand) or may be telecommunication (here, referred to as the transmission aspect that the transmission target is specified beforehand). Thus, the transmission of the modulated signals may be realized by any of radio broadcasting, cable broadcasting, radio communication, and cable communication.

For example, a broadcast station (such as broadcast facilities)/receiving station (such as a TV set) of digital terrestrial broadcasting is an example of the transmission device PROD_A/reception device PROD_B transmitting and/or receiving the modulated signal on the radio broadcast. A broadcast station (such as broadcast facilities)/receiving station (such as a TV set) of a cable television broadcasting is an example of the transmission device PROD_A/reception device PROD_B transmitting and/or receiving the modulated signal on the cable broadcast.

A server (such as a workstation)/client (such as a TV set, a personal computer, a smartphone) including a Video On Demand (VOD) service or video-sharing service using the Internet is an example of the transmission device PROD_A/reception device PROD_B transmitting and/or receiving the modulated signal through the communication (in general, a wireless or wired transmission medium is used in LAN, and a wired transmission medium is used in WAN). Here, the personal computer includes a desktop PC, a laptop PC, and a tablet PC. Smartphones also include a multifunctional portable telephone terminal.

Note that a client of a video hosting service has a function to code a video imaged with a camera and upload the video to a server, in addition to a function to decode coded data downloaded from a server and to display on a display. To be more specific, the video-sharing service client functions as both the transmission device PROD_A and the reception device PROD_B.

Figure 32:
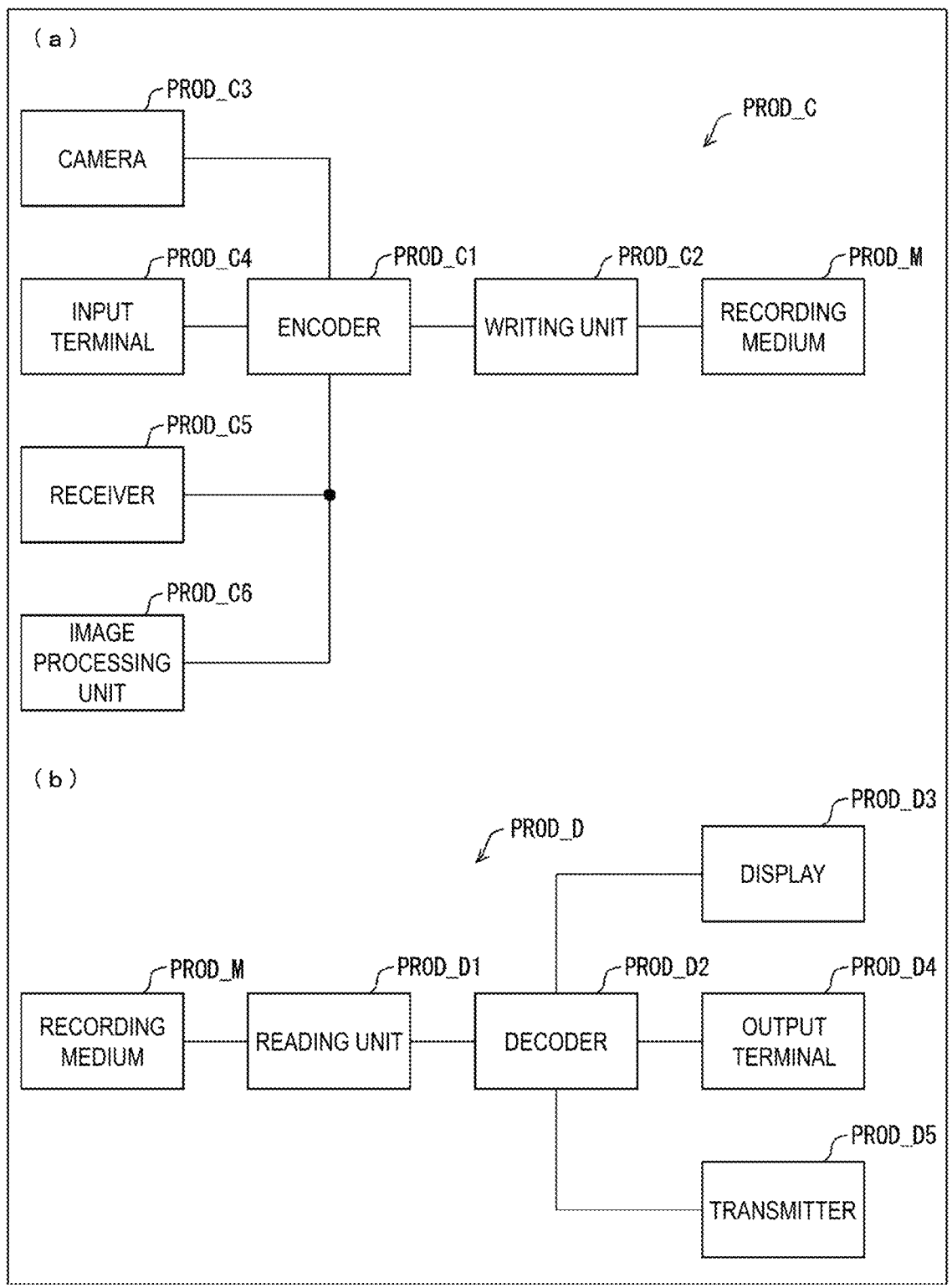
FIG. 32 is a diagram illustrating configurations of a recording device equipped with the image coding apparatus and a reproducing device equipped with the image decoding apparatus according to present embodiment. (a) illustrates the recording device equipped with the image coding apparatus, and (b) illustrates the reproducing device equipped with the image decoding apparatus.

Next, a description is given of that the image coding apparatus 11 and the image decoding apparatus 31 described above can be used to record and reproduce the video with reference to FIG. 32.

(a) of FIG. 32 is a block diagram illustrating a configuration of a recording device PROD_C equipped with the image coding apparatus 11 described above. As illustrated in (a) of FIG. 32, the recording device PROD_C includes an encoder PROD_C1 that codes a video to acquire coded data, and a writing unit PROD_C2 that writes the coded data acquired by the encoder PROD_C1 into a recording medium PROD_M. The above-mentioned image coding apparatus 11 is utilized as the encoder PROD_C1.

Note that the recording medium PROD_M may be (1) of a type that is built in the recording device PROD_C such as a Hard Disk Drive (HDD) and a Solid State Drive (SSD), (2) of a type that is connected with the recording device PROD_C such as an SD memory card and a Universal Serial Bus (USB) flash memory, or (3) of a type that is loaded into a drive device (not illustrated) built in the recording device PROD_C such as a Digital Versatile Disc (DVD) and a Blu-ray Disc (registered trademark) (BD).

The recording device PROD_C may further include, as resources for supplying a video input to the encoder PROD_C1, a camera PROD_C3 that images a video, an input terminal PROD_C4 that inputs a video from outside, a receiver PROD_C5 that receives a video, and an image processing unit PROD_C6 that generates or processes an image. (a) of FIG. 32 illustrates the configuration in which the recording device PROD_C includes all of the above components, but some of these may be omitted.

Note that the receiver PROD_C5 may receive a video which is not coded, or may receive coded data coded in a coding scheme for transmission different from a coding scheme for recording. In the latter case, a decoder PROD for transmission (not illustrated) which decodes the coded data coded using the coding scheme for transmission may be provided between the receiver PROD_C5 and the encoder PROD_C1.

Examples of such recording device PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is mainly the resource for supplying the video), a personal computer (in this case, the receiver PROD_C5 or the image processing unit C6 is mainly the resource for supplying the video), and a smartphone (in this case, the camera PROD_C3 or the receiver PROD_C5 is mainly the resource for supplying the video) are also included in the examples of the recording device PROD_C like this.

(b) of FIG. 32 is a block illustrating a configuration of a reproducing device PROD_D equipped with the image decoding apparatus 31. As illustrated in (b) of FIG. 32, the reproducing device PROD_D includes a reading unit PROD_D1 that reads out coded data written into the recording medium PROD_M, and a decoder PROD_D2 that decodes the coded data read out by the reading unit PROD_D1 to acquire a video. The above-mentioned image decoding apparatus 31 is utilized as the decoder PROD_D2.

The recording medium PROD_M may be (1) of a type that is built in the reproducing device PROD_D such as an HDD and an SSD, (2) of a type that is connected with the reproducing device PROD_D such as an SD memory card and a USB flash memory, or (3) of a type that is loaded into a drive device (not illustrated) built in the reproducing device PROD_D such as a DVD and a BD.

The reproducing device PROD_D may further include, as supply destinations of the video output by the decoder PROD_D2, a display PROD_D3 that displays the video, an output terminal PROD_D4 that outputs the video to outside, and a transmitter PROD_D5 that transmits the video. (b) of FIG. 32 illustrates the configuration in which the reproducing device PROD_D includes all of the above components, but some of these may be omitted.

Note that the transmitter PROD_D5 may transmit a video which is not coded, or may transmit coded data coded in a coding scheme for transmission different than a coding scheme for recording. In the latter case, an encoder (not illustrated) which codes the video using the coding scheme for transmission may be provided between the decoder PROD_D2 and the transmitter PROD_D5.

Examples of the reproducing device PROD_D like this include a DVD player, a BD player, and an HDD player (in this case, the output terminal PROD_D4 connected with a TV set or the like is mainly the supply destination of the video). A TV set (in this case, the display PROD_D3 is mainly the supply destination of the video), a digital signage (also referred to as an electronic signage or an electronic bulletin board, and the display PROD_D3 or the transmitter PROD_D5 is mainly the supply destination of the video), a desktop PC (in this case, the output terminal PROD_D4 or the transmitter PROD_D5 is mainly the supply destination of the video), a laptop or tablet PC (in this case, the display PROD_D3 or the transmitter PROD_D5 is mainly the supply destination of the video), and a smartphone (in this case, the display PROD_D3 or the transmitter PROD_D5 is mainly the supply destination of the video) are also included in the examples of the reproducing device PROD_D like this.

Realization as Hardware and Realization as Software

Each block of the above-mentioned image decoding apparatus 31 and the image coding apparatus 11 may be realized as a hardware by a logical circuit formed on an integrated circuit (IC chip), or may be realized as a software using a Central Processing Unit (CPU).

In the latter case, the above-described devices include a CPU to execute commands of a program for achieving the functions, a Read Only Memory (ROM) to store the program, a Random Access Memory (RAM) to load the program, and a storage device (recording medium) such as a memory to store the program and various types of data. The purpose of the embodiments of the disclosure can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured to be connectable with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the disclosure can be also realized in the form of computer data signals embedded in a carrier wave where the program code is embodied by electronic transmission.

The embodiments of the disclosure are not limited to the above-mentioned embodiments, and various modifications are possible within the scope of the claims. Thus, embodiments obtained by combining technical means modified appropriately within the scope defined by claims are included in the technical scope of the disclosure.

Supplement

The image filtering apparatus according to Aspect 1 of the disclosure (CNN filters 107, 305) includes a neural network configured to receive an input of one or multiple first type input image data and one or multiple second type input image data, and output one or multiple first type output image data, the one or multiple first type input image data each having a pixel value of a luminance or chrominance, the one or multiple second type input image data each having a pixel value of a value corresponding to a reference parameter for generating a prediction image or a differential image, the one or multiple first type output image data each having a pixel value of a luminance or chrominance.

According to the above configuration, a filter can be applied to the input image data in accordance with the image characteristic.

The image filtering apparatus according to Aspect 2 of the disclosure (CNN filters 107, 305) in Aspect 1 described above may further include a parameter determination unit (CNN parameter determining unit 114) configured to update a neural network parameter to be used by the neural network.

According to the above configuration, the parameters used by the neural network can be updated.

In the image filtering apparatus according to Aspect 3 of the disclosure (CNN filters 107, 305) in Aspect 1 or 2 described above, the reference parameter may include a quantization parameter in an image on which the image filtering apparatus acts.

In the image filtering apparatus according to Aspect 4 of the disclosure (CNN filters 107, 305) in Aspects 1 to 3 described above, the reference parameter may include a parameter indicating types of intra prediction and inter prediction in an image on which the image filtering apparatus acts.

In the image filtering apparatus according to Aspect 5 of the disclosure (CNN filters 107, 305) in Aspects 1 to 4 described above, the reference parameter may include a parameter indicating an intra prediction direction (intra prediction mode) in an image on which the image filtering apparatus acts.

In the image filtering apparatus according to Aspect 6 of the disclosure (CNN filters 107, 305) in Aspects 1 to 4 described above, the reference parameter may include a parameter indicating a partition split depth in an image on which the image filtering apparatus acts.

In the image filtering apparatus according to Aspect 7 of the disclosure (CNN filters 107, 305) in Aspects 1 to 6 described above, the reference parameter may include a parameter indicating a size of a partition in an image on which the image filtering apparatus acts.

The image filtering apparatus according to Aspect 8 of the disclosure (CNN filters 107, 305) in Aspects 1 to 7 described above may include a second neural network of which an output image is the first type input image data input to the neural network.

In the image filtering apparatus according to Aspect 9 of the disclosure (CNN filters 107, 305) in Aspects 1 to 8 described above, input to the neural network may include the first type input image data having pixel values of a first chrominance (Cb) and a second chrominance (Cr), and the second type input image data, and output from the neural network may include the first type output image data having pixel values of the first chrominance (Cb) and the second chrominance (Cr).

In the image filtering apparatus according to Aspect 10 of the disclosure (CNN filters 107, 305) in Aspects 1 to 8 described above, the neural network may include a unit configured to receive an input of first type input image data of the one or multiple first type input image data having a pixel value of a luminance and second type input image data of the one or multiple second type input image data, and output first type output image data having a pixel value of a luminance, and a unit configured to receive an input of first type input image data of the one or multiple first type input image data having pixel values of a first chrominance and a second chrominance, and second type input image data of the one or multiple second type input image data, and output first type output image data having pixel values of a first chrominance and a second chrominance.

An image filtering apparatus according to Aspect 11 of the disclosure (CNN filters 107d, 107f) includes multiple dedicated neural networks (107d1, 107f1), and a common neural network (107d3, 107f3), wherein each of the multiple dedicated neural networks (107d1, 107f1) selectively acts on input image data input to the image filtering apparatus (107) depending on a value of a filter parameter in the input image data, and the common neural network (107d3, 107f3) commonly acts on output image data output from each of the multiple dedicated neural networks, regardless of the value of the filter parameter.

According to the above configuration, the image data can be applied with both the filtering process with filter parameters values and the filtering process independent of filter parameter values.

An image filtering apparatus according to Aspect 12 of the disclosure (CNN filter 107e) includes multiple dedicated neural networks (107e2) and a common neural network (107e1), wherein the common neural network (107e1) acts on input image data input to the image filtering apparatus (107), and each of the multiple dedicated neural networks (107e2) selectively acts on output image data output from the common neural network depending on a value of a filter parameter in the input image data.

According to the above configuration, an effect is exerted similarly to Aspect 3.

In the image filtering apparatus according to Aspect 13 of the disclosure (CNN filters 107d, 107e, 107f) in Aspect 11 or 12 described above, the filter parameter may be a quantization parameter in an image on which the image filtering apparatus acts.

According to the above configuration, the filter parameter can be used in accordance with the image.

In the image filtering apparatus according to Aspect 14 of the disclosure (CNN filters 107d, 107e, 107f) in Aspect 11 or 12 described above, the filter parameter may be a parameter indicating types of intra prediction and inter prediction in an image on which the image filtering apparatus acts.

In the image filtering apparatus according to Aspect 15 of the disclosure (CNN filters 107d, 107e, 107f) in Aspect 11 or 12 described above, the filter parameter may be a parameter indicating an intra prediction direction (intra prediction mode) in an image on which the image filtering apparatus acts.

In the image filtering apparatus according to Aspect 16 of the disclosure (CNN filters 107d, 107e, 107f) in Aspect 11 or 12 described above, the filter parameter may be a parameter indicating a partition split depth in an image on which the image filtering apparatus acts on.

In the image filtering apparatus according to Aspect 17 of the disclosure (CNN filters 107d, 107e, 107f) in Aspect 11 or 12 described above, the filter parameter may be a parameter indicating a size of a partition in an image on which the image filtering apparatus acts.

An image decoding apparatus (31, 31j) according to Aspect 18 of the disclosure is an image decoding apparatus for decoding an image, the image decoding apparatus including the image filtering apparatus according to Aspects 1 to 15 as a filter configured to act on a decoded image.

An image coding apparatus (11, 11j) according to Aspect 19 of the disclosure is an image coding apparatus for coding an image, the image coding apparatus including the image filtering apparatus according to Aspects 1 to 15 as a filter configured to act on a local decoded image.

Aspects 13 to 17 of the disclosure may have the following configurations.

In the image filtering apparatus according to Aspect 13 of the disclosure (CNN filters 107d, 107e, 107f) in Aspect 9 or 10 described above, the filter parameter may be an average value of quantization parameters in an image on which the image filtering apparatus acts on.

According to the above configuration, the filter parameter can be used in accordance with the entire image.

In the image filtering apparatus according to Aspect 14 of the disclosure (CNN filters 107d, 107e, 107f) in Aspect 9 or 10 described above, the filter parameter may be an average value of parameters indicating types of intra prediction and inter prediction in an image on which the image filtering apparatus acts.

In the image filtering apparatus according to Aspect 15 of the disclosure (CNN filters 107d, 107e, 107f) in Aspect 9 or 10 described above, the filter parameter may be an average value of parameters indicating an intra prediction direction (intra prediction mode) in an image on which the image filtering apparatus acts.

In the image filtering apparatus according to Aspect 16 of the disclosure (CNN filters 107d, 107e, 107f) in Aspect 9 or 10 described above, the filter parameter may be an average value of parameters indicating a partition split depth in an image on which the image filtering apparatus acts on.

In the image filtering apparatus according to Aspect 17 of the disclosure (CNN filters 107d, 107e, 107f) in Aspect 9 or 10 described above, the filter parameter may be an average value of parameters indicating a size of a partition in an image on which the image filtering apparatus acts on.

The disclosure is not limited to each of the above-described embodiments. It is possible to make various modifications within the scope of the claims. An embodiment obtained by appropriately combining technical elements each disclosed in different embodiments falls also within the technical scope of the disclosure. Further, combining technical elements disclosed in the respective embodiments makes it possible to form a new technical feature.

INDUSTRIAL APPLICABILITY

The embodiments of the disclosure can be preferably applied to an image decoding apparatus to decode coded data where image data is coded, and an image coding apparatus to generate coded data where image data is coded. The embodiments of the disclosure can be preferably applied to a data structure of coded data generated by the image coding apparatus and referred to by the image decoding apparatus.

CROSS-REFERENCE OF RELATED APPLICATION

This application relates to Japanese Patent Applications No. 2017-155903 filed Aug. 10, 2017 and No. 2018-053226 filed Mar. 20, 2018, and claims priority based on the above applications. The contents of the above applications are incorporated herein by reference.

REFERENCE SIGNS LIST

11 Image coding apparatus
31 Image decoding apparatus
107 CNN filter (image filtering apparatus)
114 CNN parameter determination unit (parameter determination unit)

The invention claimed is:

1. An image filtering apparatus comprising:
a neural network configured to input (i) one or multiple first type input image data and (ii) one or multiple second type input image data, and output one or multiple first type output image data, wherein
the one or multiple first type input image data each have a pixel value of a luminance or chrominance, the one or multiple second type input image data each indicate a pixel value of a value of a reference parameter used for generating a prediction image or a differential image, and the one or multiple first type output image data each have a pixel value of a luminance or chrominance, and
the second type input image data, derived for a unit of region, is inputted to the neural network as one of image channels.

2. The image filtering apparatus according to claim 1, further comprising:
a parameter determination unit configured to update a neural network parameter to be used by the neural network.

3. The image filtering apparatus according to claim 1, wherein
the reference parameter is a quantization parameter in an image on which the image filtering apparatus acts.

4. The image filtering apparatus according to claim 1, wherein the reference parameter is a parameter indicating types of intra prediction and inter prediction in an image on which the image filtering apparatus acts.

5. The image filtering apparatus according to claim 1, wherein the reference parameter is a parameter indicating an intra prediction direction (intra prediction mode) in an image on which the image filtering apparatus acts.

6. The image filtering apparatus according to claim 1, wherein the reference parameter includes a parameter indicating a partition split depth in an image on which the image filtering apparatus acts.

7. The image filtering apparatus according to claim 1, wherein the reference parameter includes a parameter indicating a size of a partition in an image on which the image filtering apparatus acts.

8. The image filtering apparatus according to claim 1, further comprising:
a second neural network of which an output image is the first type input image data input to the neural network.

9. The image filtering apparatus according to claim 1, wherein the neural network is configured to input (i) the first type input image data indicating pixel values of a first chrominance and a second chrominance and (ii) the second type input image data, and
the neural network is configured to output the first type output image data indicating pixel values of the first chrominance and the second chrominance.

10. The image filtering apparatus according to claim 1, wherein the neural network includes:
a unit configured to input (i) first type input image data of the one or multiple first type input image data having a pixel value of a luminance and (ii) second type input image data of the one or multiple second type input image data, and to output first type output image data having a pixel value of a luminance; and
a unit configured to input (i) first input image data of the one or multiple first type input image data having pixel values of a first chrominance and a second chrominance and (ii) second type input image data of the one or multiple second type input image data, and to output first type output image data having pixel values of a first chrominance and a second chrominance.

11. An image decoding apparatus for decoding an image, the image decoding apparatus comprising:
the image filtering apparatus according to claim 1 as a filter configured to act on a decoded image.

12. An image coding apparatus for coding an image, the image coding apparatus comprising:
the image filtering apparatus according to claim 1 as a filter configured to act on a local decoded image.

* * * * *